United States Patent
Russ et al.

(10) Patent No.: US 11,527,126 B1
(45) Date of Patent: Dec. 13, 2022

(54) ARTIFICIAL SKIN ON GAMING DEVICES

(71) Applicant: IGT, Las Vegas, NV (US)

(72) Inventors: Michael Russ, Graz (AT); David Froy, Lakeville-Westmorland (CA); Sven Aurich, Schwanberg (AT)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/374,703

(22) Filed: Jul. 13, 2021

(51) Int. Cl.
*G07F 17/32* (2006.01)
*G06F 3/04883* (2022.01)
*G06F 3/01* (2006.01)

(52) U.S. Cl.
CPC .......... *G07F 17/3209* (2013.01); *G06F 3/016* (2013.01); *G06F 3/04883* (2013.01); *G07F 17/3206* (2013.01); *G07F 17/3216* (2013.01); *G07F 17/3223* (2013.01); *G07F 17/3227* (2013.01); *G07F 17/3262* (2013.01); *G07F 17/3213* (2013.01)

(58) Field of Classification Search
CPC ......... A63F 2009/2401; G07F 17/3209; G07F 17/3206; G07F 17/3216; G07F 17/3262; G06F 3/016; G06F 3/04883
See application file for complete search history.

(56) References Cited

U.S. PATENT DOCUMENTS

| | | | | |
|---|---|---|---|---|
| 5,012,230 A | * | 4/1991 | Yasuda | G06F 3/033 345/184 |
| 9,625,330 B2 | * | 4/2017 | Park | G01L 1/205 |
| 10,353,506 B2 | * | 7/2019 | Vosgueritchian | G06F 3/0447 |
| 10,872,499 B1 | | 12/2020 | Russ et al. | |
| 10,963,075 B2 | * | 3/2021 | Togashi | G02F 1/13338 |

(Continued)

OTHER PUBLICATIONS

Teyssier et al, "Skin-On Interfaces: A Bio-Driven Approach for Artificial Skin Design to Cover Interactive Devices", Oct. 20, 2019 (retrieved Mar. 15, 2022), <https://web.archive.org/web/20191020103417/https://marcteyssier.com/content/publications/uist19-skinon-teyssier.pdf>. 16 Pages. (Year: 2019).*

(Continued)

*Primary Examiner* — Milap Shah
*Assistant Examiner* — Jason Pinheiro
(74) *Attorney, Agent, or Firm* — Sheridan Ross P.C.

(57) ABSTRACT

The present disclosure relates generally to a gaming device or system that detects, at each input electrode location of a plurality of elastically deformable input electrode locations, an amount of pressure applied to an elastically deformable outer layer at a corresponding input electrode location in response to deformation of the elastically deformable outer layer by physical contact with a player of a gaming device; determines that the player has applied pressure to the plurality of elastically deformable input electrode locations continuously over at least a predetermined time interval; determines a pressure pattern corresponding to the plurality of elastically deformable input electrode locations; compares the pressure pattern to a plurality of different pressure patterns corresponding to a plurality of different player gestures to determine a player gesture corresponding to the pressure pattern; and determines, based on the determined player gesture and a comparison of the amount of applied pressure to a threshold magnitude, an operation of the gaming device.

20 Claims, 13 Drawing Sheets

(56) References Cited

U.S. PATENT DOCUMENTS

| | | | |
|---|---|---|---|
| 11,030,846 B2 | 6/2021 | Keilwert et al. | |
| 11,204,292 B1* | 12/2021 | Asiri | G01L 9/0058 |
| 2008/0113772 A1* | 5/2008 | Burrill | G07F 17/3237 |
| | | | 463/43 |
| 2012/0322527 A1* | 12/2012 | Aoki | G07F 17/3209 |
| | | | 463/16 |
| 2014/0160063 A1* | 6/2014 | Yairi | G06F 3/04886 |
| | | | 345/173 |
| 2019/0107889 A1* | 4/2019 | Togashi | G06F 3/0414 |
| 2020/0398155 A1* | 12/2020 | Niwa | A63F 13/23 |
| 2021/0019009 A1* | 1/2021 | Jung | G01D 5/24 |
| 2021/0060413 A1* | 3/2021 | Kurata | A63F 13/211 |
| 2021/0060416 A1* | 3/2021 | Ueno | A63F 13/212 |
| 2021/0082230 A1* | 3/2021 | Keilwert | G07F 17/3223 |
| 2021/0082231 A1* | 3/2021 | Russ | G07F 17/3211 |
| 2021/0082232 A1 | 3/2021 | Small et al. | |
| 2021/0082233 A1* | 3/2021 | Small | G07F 17/3213 |
| 2021/0241566 A1 | 8/2021 | Russ et al. | |

OTHER PUBLICATIONS

Dabrowska et al. "Materials used to simulate physical properties of human skin," Skin Research and Technology, 2016, vol. 22, pp. 3-14.

Pawlaczyk et al. "Age-dependent biomechanical properties of the skin," Postepy Dermatologii I Alergologii, Oct. 2013, vol. 30, No. 5, pp. 302-306.

Teyssier "Skin-On Interfaces," Marc Teyssier, 2019, 36 pages [retrieved online from: https://marcteyssier.com/projects/skin-on/].

"Dragon Skin® Series: Addition Cure Silicone Rubber Compounds," grs.ie, retrieved May 5, 2021, 11 pages [retrieved online May 5, 2021 from www.grs.ie/product/dragon-skin-series].

U/defaaago "[QUESTION] Pigments & casting in silicone (Dragon Skin 10)," Reddit, Jun. 9, 2019, 2 pages [retrieved online May 5, 2021 from: https://www.reddit.com/r/sfx/comments/byls3t/question_pigments_casting_in_silicone_dragon_skin/].

Kleinman "Phone case created out of artificial skin," BBC News, Oct. 21, 2019, 7 pages [retrieved online May 5, 2021 from: www.bbc.com/news/technology-49972412].

* cited by examiner

ARTIFICIAL SKIN ON GAMING DEVICES

BACKGROUND

The present disclosure is directed generally towards gaming systems and devices and, in particular, electronic gaming machines and tables.

An Electronic Gaming Machine (EGM), such as a slot machine, is a device that is used for playing a game of chance or skill or mixed chance and skill. The EGM receives bets on a game output of the EGM and pays out awards to players for winning outcomes. Video slot machines do not use mechanical reels but use graphical reels on a computerized display. As there are no mechanical constraints on the design of video slot machines, games often use at least five reels and may also use non-standard layouts.

A current trend in gaming machines is to enhance and enrich the player experience through virtual and augmented reality and other sophisticated user interfaces. Virtual and augmented reality gaming machines are rapidly gaining in popularity. Virtual reality (VR) refers to a computer-generated simulation in which a person can interact within an artificial three-dimensional environment using wearable electronic devices, such as special goggles and/or gloves fitted with sensors and/or headsets. In this simulated artificial environment, the user is able to have a realistic-feeling experience. Augmented reality (AR) is different from VR, in that AR enhances the real world as it exists with graphical overlays and commonly does not create a fully immersive experience.

BRIEF SUMMARY

In certain embodiments, the present disclosure relates to a method, comprising: (a) detecting, at each input electrode location of a plurality of elastically deformable input electrode locations, an amount of pressure applied to an elastically deformable outer layer at a corresponding input electrode location in response to deformation of the elastically deformable outer layer by physical contact with a player of a gaming device; (b) determining, by a processor, that the player has applied pressure to the plurality of elastically deformable input electrode locations continuously over at least a predetermined time interval; (c) determining, by the processor, a pressure pattern corresponding to the plurality of elastically deformable input electrode locations; (d) comparing, by the processor, the pressure pattern to a plurality of different pressure patterns corresponding to a plurality of different player gestures to determine a player gesture corresponding to the pressure pattern; and (e) determining, by the processor based on the determined player gesture and a comparison of the amount of applied pressure to a threshold magnitude, an operation of the gaming device.

In some embodiments, the present disclosure also relates to a gaming device comprising: a display to render objects in a game, an input device comprising an elastically deformable outer layer to contact a player of the gaming device and an elastically deformable pressure sensing layer, operatively coupled to the elastically deformable outer layer, that comprises a plurality of input electrode locations electrically coupled with a pressure sensor to detect, for each input electrode location, an amount of pressure applied to the elastically deformable outer layer at a corresponding input electrode location in response to deformation of the input device by physical contact with the player of the gaming device, a processor operatively coupled with the display and input device, and a computer memory coupled with the processor and comprising instructions stored thereon that, when executed by the processor, enable the processor to: (a) receive first and second sets of pressure values corresponding respectively to first and second amounts of pressure being applied to different portions of the plurality of input electrode locations; (b) receive first and second timing signals associated respectively with the first and second sets of pressure values, each of the first and second timing signals indicating a time interval over which the player continuously applied the first and second amounts of pressure, respectively; (c) determine first and second pressure patterns, each of which corresponds to a portion of the plurality of input electrode locations; (d) determine, based on the first and second timing signals, that the first and second pressure patterns are part of a common gesture by the player; (e) compare the first and second pressure patterns to a plurality of different pressure patterns corresponding to a plurality of different player gestures to determine a player gesture corresponding to the first and second pressure patterns; and (f) modify, based on the determined player gesture and a comparison of the first and/or second sets of pressure values to a threshold value, an operation of the gaming device.

In some embodiments, the present disclosure also relates to a gaming device, comprising: an input device comprising: an elastically deformable outer layer to contact a player of the gaming device; an elastically deformable pressure sensing layer, operatively coupled to the elastically deformable outer layer, the elastically deformable pressure sensing layer comprising a plurality of input electrode locations electrically coupled with a pressure sensor to sense, for each input electrode location, an amount of pressure applied to the elastically deformable outer layer at a corresponding input electrode location in response to deformation of the input device by the player of the gaming device; and a haptic feedback device, operatively coupled to the elastically deformable outer layer, to generate a haptic player feedback response in the elastically deformable outer layer; a processor operatively coupled with the input device; and a computer memory device coupled with the processor and comprising instructions stored thereon that, when executed by the processor, enable the processor to: (a) receive the amount of pressure applied by the player at a selected input electrode location of the plurality of input electrode locations; (b) compare the amount of applied pressure to a baseline magnitude, to determine an emotional state of the player of the gaming device; and (c) based on the emotional state of the player, generate the haptic player feedback response.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

An Electronic Gaming Machine (EGM) as used herein refers to any suitable electronic gaming device which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a gaming device.

An "Electronic Gaming Table" or "Electronic Table Game" (EGT) as used herein refers to a gaming device in the form of a table that enables a player to play a game (including but not limited to a game of chance, a game of skill, and/or a game of partial skill), such as roulette, poker, blackjack or Baccarat, to potentially win one or more awards. There can be multiple player seats in the electronic gaming table for tournament or side game play, and each player can operate or play the game in the electronic gaming table.

A "Video Gaming Machine" (VGM) is a type of EGM that extensively uses multimedia rather than mechanical modalities for the gaming experience. For example, a video slot machine does not use mechanical reels, and instead uses graphical reels on a computerized display. As there are no mechanical constraints on the design of video slot machines, games often use at least five reels, and may also use non-standard layouts.

A "Virtual Reality" (VR) gaming machine as used herein refers to a gaming device that enables virtual reality gaming, or the application of a three-dimensional (3-D) artificial environment to a computer game. Virtual reality environments are created with VR software and presented to the user in such a way that VR environment supersedes the real-world environment, helping the user experience the VR environment as real. A VR game might involve a 3-D image that can be explored interactively on a computing device by manipulating keys, a mouse or touchscreen. More sophisticated and immersive examples include VR headsets, wrap-around display screens and VR rooms augmented with wearable computers and sensory components, such as scents and haptics devices for tactile feedback.

An "Augmented Reality" (AR) gaming machine as used herein refers to a gaming device that provides an interactive gaming experience of a real-world environment where the objects that reside in the real world are enhanced by computer-generated perceptual information, sometimes across multiple sensory modalities, including visual, auditory, haptic, somatosensory, and olfactory modalities. AR can be defined as a system that fulfills three basic features: namely a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. Augmented reality is related to two largely synonymous terms: mixed reality and computer-mediated reality.

A "gaming system" as used herein refers to various configurations of: (a) one or more central servers, central controllers, or remote hosts; (b) one or more gaming devices such as those located on a casino floor; and/or (c) one or more personal gaming devices, such as desktop computers, laptop computers, tablet computers or computing devices, personal digital assistants, mobile phones, and other mobile computing devices.

A "puzzle" refers to is a game or problem that tests a person's ingenuity or knowledge. In a puzzle, the solver is expected to put pieces together in a logical way, to arrive at a predetermined solution of the puzzle.

Additional features and advantages are described herein and will be apparent from the following Description and the figures.

BRIEF DESCRIPTION OF THE SEVERAL VIEWS OF THE DRAWINGS

FIG. 8 illustrates a display bezel of a gaming device comprising elastically deformable input devices in accordance with embodiments of the present disclosure;

DETAILED DESCRIPTION

Figure 1:
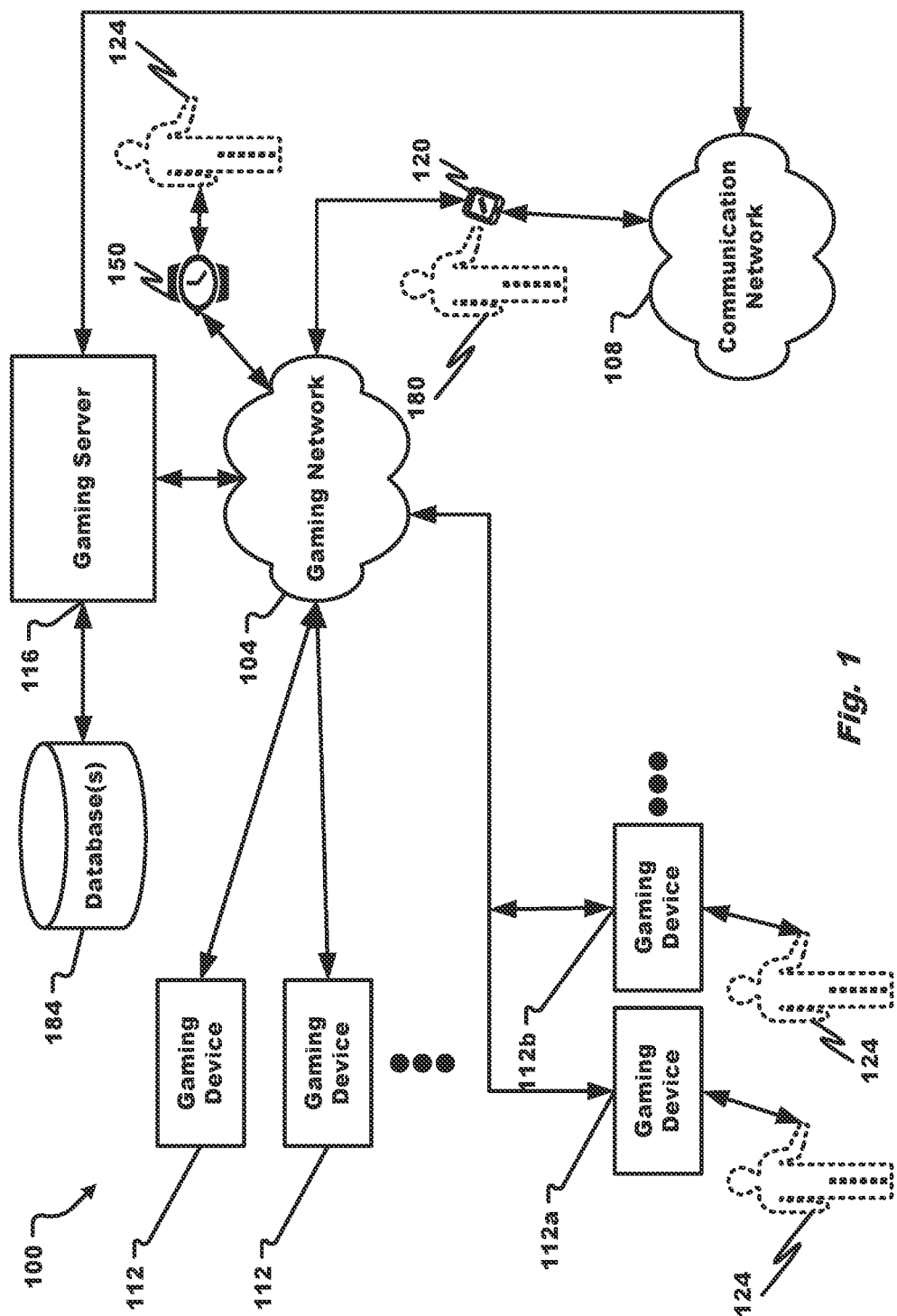
FIG. 1 illustrates a gaming system for in accordance with embodiments of the present disclosure.

The present disclosure is directed to an elastically deformable input device positioned on one or more surfaces of a gaming device, such as an EGM or EGT, that is configured to receive and process tactile input from a player. The output of the elastically deformable surface can be used for player gesture detection, player mood or emotional state detection, other analysis of player input, and haptic feedback response generation from the gaming device to the player. The elastically deformable input device can be used on and/or as a touch surface (such as a touch screen, a touch pad, a keyboard, a seat or arm rest, a mechanical button, a display, a lighting bezel, or other surfaces that can act as touch interfaces) on a gaming device. In some applications, the gaming device can be substantially covered or furnished with the elastically deformable input device.

The elastically deformable input device can include an elastic and deformable outer layer to contact physically the player. The outer layer can be an artificial skin having the feel and/or appearance (e.g., color and texture) and/or mechanical properties of natural skin. In such applications, the thickness of the outer layer can be similar to that of the epidermis layer. Typically, the outer layer has a thickness typically of no more than about 2 mm. To resemble skin, the outer layer can be composed of a flexible and deformable material, such as an elastomeric material and/or an epoxy resin, with a silicone (such as "Dragon-Skin-Silicone™") or polyurethane being typical.

The elastically deformable input device can include, beneath and adjacent to the outer layer, an elastic and deformable sensing network layer, such as a conductive electrode network in an interconnecting configuration of transversely oriented electrodes. The electrodes can be, for example, a conductive metal, a conductive ink, a conductive silicon, a conductive fabric, and/or a conductive thread. The conductive electrode network can be configured in a matrix or discrete layout and sense pressure by a difference between a player applied resistance and a baseline resistance and/or between a player applied capacitance and a baseline capacitance.

The elastically deformable sensing network layer can comprise a plurality of input electrode locations electrically coupled with one or more pressure sensors to detect, for each input electrode location, an amount of pressure applied to the elastically deformable outer layer at a corresponding input electrode location in response to deformation and deflection of the input device sensing network layer by physical contact with the player of the gaming device. In one configuration, each input electrode location is formed at an intersection of transversely oriented electrodes, such as a grid pattern, connected electrically to one or more pressure sensors. Physical or tactile interaction with the outer layer, or skin surface, such as stroking, pinching, tickling, rubbing, stretching, a slapping, finger tapping, finger moving, and grabbing, can be detected and interpreted by the pressure sensor(s).

The elastically deformable input device can include, beneath and adjacent to the sensing network layer, an elastic and deformable kinesthetic or inner layer that imparts desired mechanical properties to the input device. The mechanical properties can resemble those of human skin. In some applications, each layer of the input device and the input device itself have a Young's modulus typically ranging from about 0.045 to about 0.35 MPa when measured by a suction test; a Young's modulus typically ranging from about 0.30 to about 1.25 MPa when measured by a torsion test; an elastic strain typically of at least about 7.5% relative to a dimension in an absence of elastic deformation; and/or an elastic stretch width and an elastic stretch length typically of at least about 7.5%.

The elastically deformable input device can include, in the sensing network and/or inner layer, other sensors or transducers to collect additional types of sensed information. For example, the device can include in or adjacent to the outer or inner layers a temperature sensor or thermocouple to sense both player squeeze movements, player body temperature, and player touch spatial location.

The elastically deformable input device can map the sensed physical contact of the player to a corresponding single or multi-touch player gesture. The elastically deformable sensing network layer can detect, at each input electrode location of a plurality of elastically deformable input electrode locations, an amount of pressure applied by the player to the elastically deformable outer layer at a corresponding input electrode location in response to elastic deformation of the elastically deformable outer layer by physical contact with a player of a gaming device. The gaming device can determine that the player has applied pressure to the plurality of elastically deformable input electrode locations continuously over at least a predetermined time interval and a pressure pattern corresponding to the plurality of elastically deformable input electrode locations. The gaming device can compare the pressure pattern to a plurality of different pressure patterns corresponding to a plurality of different player gestures to determine a player gesture corresponding to the pressure pattern and determine, based on the determined player gesture and a comparison of the amount of applied pressure to a threshold magnitude, a function or operation of the gaming device. The function or operation of the gaming device can be, inter alia, a game operation or response (e.g., a speed of game play and other operations in the wagering game (such as changing bets, making in-game decisions, performing fast reel stop, etc.— basically adjusting any game-parameter could be possible) based on a rate of player inputs), a game outcome, or other game event, behavior of a virtual avatar, and, as discussed below, a haptic feedback response imparted by the gaming device to the player.

For multi-touch gestures, the elastically deformable sensing network layer can detect first and second sets of pressure values corresponding respectively to first and second amounts of pressure applied to different first and second portions of the plurality of elastically deformable input electrode locations. The gaming device, based on the first and second amounts of applied pressure, can use first and second sets of pressure values, each indicating a time interval over which the player continuously applied the first and second amounts of pressure, respectively, to determine that the player has applied the pressure to the plurality of elastically deformable input electrode locations continuously and thereby determine first and second pressure patterns. Based on the first and second timing signals, the gaming device can determine that the first and second pressure patterns are part of a common multi-touch player gesture by the player. The spatially discrete first and second pressure patterns can then be compared to the plurality of different pressure patterns corresponding to the plurality of different player gestures to determine a player gesture corresponding to the first and second pressure patterns.

Output of the elastically deformable sensing network layer can further be used by the gaming device to determine an emotional state of the player. In response to receiving the amount of pressure applied by the player at a selected input electrode location of the plurality of input electrode locations, the gaming device can compare the amount of applied pressure to a baseline magnitude to determine an emotional state of the player of the gaming device. Based on the emotional state of the player, the gaming device can compare the emotional state against a plurality of potential haptic feedback responses to select and generate the haptic feedback response. The elastically deformable input device can include one or more biometric sensors, such as a thermometer or thermocouple, a light source, a pulse sensor, and the like, to provide additional input into determining the player emotional state.

The elastically deformable input device can enable natural touch interactions between the player and the gaming device, such as the user expressing haptic emotions to the gaming device. A player can transfer the haptic emotions to the gaming device, such as to play a slot game using different haptic interactions or interact with a virtual avatar, and the gaming device can react differently based on the type of haptic emotion expressed, for instance, to the avatar (e.g., the avatar's reaction to the expression of haptic emotion may have an impact on the game, such as by altering, modifying, invoking, or selecting a game operation).

The gaming device can provide a haptic feedback response to the player through the elastically deformable input device. Examples of the haptic feedback response include changing a temperature of the elastically deformable outer layer, changing a hardness of the elastically deformable outer layer, changing a texture of the elastically deformable outer layer, changing a color of the elastically deformable outer layer, vibrating the elastically deformable outer layer, transferring by electrode emission low voltage electric shock signals to the player to simulate touch sensations on the player's skin, and increasing an electrostatic force resisting physical contact of the elastically deformable outer layer by the player. Using such signal emissions, an in-game avatar can express an emotional state or other feeling tangibly to the player.

The present disclosure envisions in some configurations a wearable device for the player that transfers haptic feedback responses indicating feelings from the gaming device to the player or vice versa. The wearable device can provide any of the haptic feedback responses indicated above.

The input device can be configured to provide the physiological functions, such as thermal regulation, and interactive properties, such as stretchability, of the human skin. The input device can, for example, comprise in the inner layer a heating or cooling device, such as a Peltier thermoelectric heater or heat exchange fluid network, to allow the input device to be heated and cooled to mimic human skin. A softness or hardness of the skin can be controlled, such as by embedding in the inner layer a ferro material that hardens in the presence of an applied magnetic field. A touch sensitive or gaming device controlled haptic feedback motor or actuator can be embedded or positioned in the inner layer to provide haptic feedback responses, such as vibration of the input device and outer layer. Surface haptic feedback responses can also be provided, such as by positioning a haptic feedback device (such as an electrostatic material, actuator (e.g., ultrasonic actuator), and/or vibration engine) in the inner and/or outer layers. Spatial or XY position (or XYZ position depending on the application) and amount of pressure can be used to control the force and the actuators used to create the haptic feedback response. Examples of haptic feedback responses include "goosebumps" (in which the outer layer is stretched or clinched (e.g., tensed vs. relaxed)), skin deflections that can represent illness; vibrations in the outer layer to replicate shaking or shivering, and the like.

The appearance of the outer layer can also be altered to provide feedback to the player. For example, a light source, such as light pipes optically connected with light emitting diodes and/or a light crystal display, can be positioned in the inner and/or outer layers to emit selected wavelengths of light that interact with pigments or reflective particles in the outer layer to cause the outer layer color to change as viewed by the player. The outer layer can be substantially transparent or translucent and permit the passage of selected wavelengths of light.

In any of the above haptic feedback response examples, the gaming device can simultaneously emit haptic feedback responses to the player and receive haptic feedback responses from the player. By way of illustration, during generation of the haptic feedback response, a selected input electrode location can sense a second amount of pressure applied to the elastically deformable outer layer at the selected input electrode location in response to deformation of the input device by physical contact with the player of the gaming device and apply a calibration table to the sensed second amount of pressure to remove, from the sensed second amount of pressure, a contribution from the haptic player feedback response and thereby provide an adjusted second amount of pressure attributable to deformation of the input device by the player.

The spatial locations of the pressure pattern(s) can further enable the gaming device to determine, based on the corresponding elastically deformable input electrode locations, a spatial location of a body part of the player. This can be used in selecting an appropriate type and location of a haptic feedback response from among a plurality of types of potential haptic feedback responses.

By mimicking the elastic deformability of natural skin, the input device can provide a user gaming interface with which players are familiar. Such interfaces can effectively communicate a high level of interactivity that facilitates the discoverability of gestures that in turn enhance player interaction, thereby improving player expressiveness and experience for mediated communication and interface control in gaming applications.

The elastically deformable input device can address technical problems associated with artificial skin interfaces, namely selecting a sensing technique, an overall electrode pattern, and an electrode material compatible with artificial skin's properties so as not to hinder its elastic deformation.

The elastically deformable input device can have a variety of applications in networked gaming system. For example, another internetworked gaming device can receive a haptic feedback response from a different player and cause the gaming device to provide, via the wearable device, the haptic feedback responses to be emitted and transferred to the player. The gaming device, for example, can receive, from a different gaming device, an emotional state of another player and, based on the emotional state of the other player, generate, by the haptic feedback device, a further haptic feedback response to the player. Such player-to-player haptic interactions can provide new levels of player interaction in gaming.

In various embodiments, the gaming system of the present disclosure includes: (a) one or more gaming devices in combination with one or more central servers, central controllers, or remote hosts; (b) one or more personal gaming devices in combination with one or more central servers, central controllers, or remote hosts; (c) one or more personal gaming devices in combination with one or more gaming devices; (d) one or more personal gaming devices, one or more gaming devices, and one or more central servers, central controllers, or remote hosts in combination with one another; (e) a single gaming device; (f) a plurality of gaming devices in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "EGT" as used herein represents one EGT or a plurality of EGTs, "VR gaming machine" as used herein represents one VR gaming machine or a plurality of VR gaming machines, "AR gaming machine" as used herein represents one AR gaming machine or a plurality of AR gaming machines, and "VGM" as used herein represents one VGM or a plurality of VGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts. A "gaming device" as used herein may be understood to include an EGM, multiple EGMs, an EGT, multiple EGTs, a VR gaming machine, multiple VR gaming machines, an AR gaming machine, multiple AR gaming machines, a VGM, multiple VGMs, a personal gaming device, multiple personal gaming devices, a mobile device, multiple mobile devices, and combinations thereof.

As noted above, in various embodiments, the gaming system includes a gaming device in combination with a central server, central controller, or remote host. In such embodiments, the gaming device is configured to communicate with the central server, central controller, or remote host through a data network or remote communication link. In certain such embodiments, the gaming device is configured to communicate with another gaming device through the same data network or remote communication link or through a different data network or remote communication link. For example, the gaming system includes a plurality of gaming devices that are each configured to communicate with a central server, central controller, or remote host through a data network.

In certain embodiments in which the gaming system includes a gaming device in combination with a central server, central controller, or remote host, the central server, central controller, or remote host is any suitable computing device (such as a server) that includes at least one processor and at least one memory device or data storage device. As further described herein, the gaming device includes at least one gaming device processor configured to transmit and receive data or signals representing events, messages, commands, or any other suitable information between the gaming device and the central server, central controller, or remote host. The at least one processor of that gaming device is configured to execute the events, messages, or commands represented by such data or signals in conjunction with the operation of the gaming device. Moreover, the at least one processor of the central server, central controller, or remote host is configured to transmit and receive data or signals representing events, messages, commands, or any other suitable information between the central server, central controller, or remote host and the gaming device. The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the gaming device. Further, one, more than one, or each of the functions of the at least one processor of the gaming device may be performed by the at least one processor of the central server, central controller, or remote host.

In certain such embodiments, computerized instructions for controlling any games displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In various embodiments in which the gaming system includes a plurality of gaming devices, one or more of the gaming devices are thin client gaming devices and one or more of the gaming devices are thick client gaming devices. In other embodiments in which the gaming system includes one or more gaming devices, certain functions of one or more of the gaming device are implemented in a thin client environment, and certain other functions of one or more of the gaming devices are implemented in a thick client environment. In one such embodiment in which the gaming system includes a gaming device and a central server, central controller, or remote host, computerized instructions for controlling any games displayed by the gaming device are communicated from the central server, central controller, or remote host to the gaming device in a thick client configuration, and computerized instructions for controlling any games, displayed objects, or other functions or features displayed by the gaming device are executed by the central server, central controller, or remote host in a thin client configuration.

In certain embodiments in which the gaming system includes: (a) a gaming device configured to communicate with a central server, central controller, or remote host through a data network; and/or (b) a plurality of gaming devices configured to communicate with one another through a communication network, the communication network may include a local area network (LAN) in which the gaming devices are located substantially proximate to one another and/or the central server, central controller, or remote host. In one example, the gaming devices and the central server, central controller, or remote host are located in a gaming establishment or a portion of a gaming establishment.

In other embodiments in which the gaming system includes: (a) a gaming device configured to communicate with a central server, central controller, or remote host through a data network; and/or (b) a plurality of gaming devices configured to communicate with one another through a communication network, the communication network may include a wide area network (WAN) in which one or more of the gaming devices are not necessarily located substantially proximate to another one of the gaming devices and/or the central server, central controller, or remote host. For example, one or more of the gaming devices are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the gaming devices are located. In certain embodiments in which the communication network includes a WAN, the gaming system includes a central server, central controller, or remote host and a gaming device each located in a different gaming establishment in a same geographic area, such as a same city or a same state. Gaming systems in which the communication network includes a WAN are substantially identical to gaming systems in which the communication network includes a LAN, though the quantity of gaming devices in such gaming systems may vary relative to one another.

In further embodiments in which the gaming system includes: (a) a gaming device configured to communicate with a central server, central controller, or remote host through a data network; and/or (b) a plurality of gaming devices configured to communicate with one another through a communication network, the communication network may include an internet (such as the Internet) or an intranet. In certain such embodiments, an Internet browser of the gaming device is usable to access an Internet game page from any location where an Internet connection is available. In one such embodiment, after the gaming device accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card, or other smart card inserted into a card reader; by validating a unique player identification number associated with the player by the central server, central controller, or remote host; or by identifying the gaming device, such as by identifying the MAC address or the IP address of the Internet facilitator. In various embodiments, once the central server, central controller, or remote host identifies the player, the central server, central controller, or remote host enables placement of one or more wagers on one or more plays of the game and plays via the Internet browser of the gaming device.

The central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of gaming devices to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Embodiments of the present disclosure will be described in connection with a player interacting with one or more gaming devices. It should be appreciated that a gaming device, as described herein, may include a gaming device, mobile device, server, and other computational device. While embodiments of the present disclosure will be described in connection with the example of an EGT, EGM, VR gaming machine, AR gaming machine, or VGM, it should be appreciated that embodiments of the present disclosure are not so limited. For instance, other types of computational devices, such as portable user devices, smartphones, tablets, laptops, Personal Computers (PCs), wearable devices, etc. may be configured with gaming device functionality (e.g., to implement a game of chance, a game or skill, or a hybrid game of chance/game of skill), similar to a gaming device as described herein.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a system according to embodiments of the present disclosure may include one, some, or all of the components depicted in the system 100 and does not necessarily have to include all of the components in a single device. The illustration of a single central gaming server 116 is for ease of discussion and should not be construed as limiting embodiments of the present disclosure to a single-server architecture.

The gaming system 100 is shown to include a gaming network 104 and a communication network 108. The gaming network 104 may correspond to a distributed set of devices that interconnect and facilitate machine-to-machine communications between one or multiple gaming devices 112$a, b, \ldots$ and the gaming server 116. The communication network 108 may correspond to a distributed set of devices that interconnect and facilitate machine-to-machine communications between the gaming server 116 and personal gaming devices 120 carried by players 124. In some embodiments, the gaming network 104 and communication network 108 may correspond to different networks administered and/or maintained by different entities. In such a scenario, one or more of a gateway, firewall, or similar network border device may reside between the gaming network 104 and the communication network 108 (e.g., to maintain security preferences/settings of each network). In another possible scenario, the gaming network 104 and communication network 108 may correspond to the same or similar network. As a non-limiting example of the second scenario, the gaming network 104 and communication network 108 may both correspond to a distributed Internet Protocol (IP)-based communication network, such as the Internet.

The gaming network 104 and communication network 108 may include any type of known communication medium or collection of communication media and may use any type of protocols to transport messages between devices. As some non-limiting examples, the gaming network 104 may correspond to a WAN or LAN in which the plurality of gaming devices 112a, b, . . . are configured to communicate with the gaming server 116 using devices that are owned and administered by the same entity that administers security settings of the gaming devices 112a, b, . . . As such, the gaming network 104 may be considered a secure or trusted network.

The communication network 108, in some embodiments, may also include a WAN or LAN. Alternatively or additionally, the communication network 108 may include one or more devices that are not administered by the same entity administering the gaming devices 112a, b, . . . . Thus, the communication network 108 may be considered an untrusted or unsecure network from the perspective of the gaming network 104. The Internet is an example of the communication network 108 that constitutes an IP network consisting of many computers, computing networks, and other communication devices located all over the world, which are connected through many telephone systems and other means. Other examples of the communication network 108 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 108 may be administered by a Mobile Network Operator (MNO) whereas a casino entity may administer the gaming network 104.

It should be appreciated that the gaming network 104 and/or communication network 108 need not be limited to any one network type, and instead may be comprised of a number of different networks and/or network types. Moreover, the gaming network 104 and/or communication network 108 may comprise a number of different communication media such as coaxial cable, copper cable/wire, fiber-optic cable, antennas for transmitting/receiving wireless messages, wireless access points, routers, and combinations thereof.

In some embodiments, the gaming devices 112a, b, . . . may be distributed throughout a single property or premises (e.g., a single casino floor) or the gaming devices 112a, b, . . . may be distributed among a plurality of different properties. In a situation where the gaming devices 112 a, b, . . . are distributed in a single property or premises, the gaming network 104 may include at least some wired connections between network nodes (e.g., a LAN or multiple LANs). As a non-limiting example, the nodes of the gaming network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 112 a, b, . . . may utilize the same or different types of communication protocols to connect with the gaming network 104. It should also be appreciated that the gaming devices 112 a, b, . . . may or may not present the same type of game to a player 124. It should be appreciated that a gaming device 112 a, b, . . . may correspond to one example of a gaming device. It should also be appreciated that the functions and features described in connection with a gaming device 112 a, b, . . . may be provided in any other type of gaming device without departing from the scope of the present disclosure.

In some embodiments, the gaming devices 112 a, b, . . . may be configured to communicate with a centralized management server in the form of the central gaming server 116. The central gaming server 116 may be configured to centrally manage games of chance, games of skill, or hybrid games of chance/skill played at the gaming devices 112 a, b, . . . (e.g., slot games), enable execution of a different game (e.g., a card game), monitor player 124 activity at the gaming devices 112 a, b, . . . , track player 124 association with a gaming device 112, facilitate communications with players 124 via the gaming devices 112 a, b, . . . , facilitate communications with players 124 via the personal gaming devices 120 (or other gaming devices), and/or perform any other task in connection with games played by a player 124 at gaming devices.

In some embodiments, a player 124 may be enabled to enhance their experience with the gaming devices 112 a, b, . . . via interactions with their personal gaming device 120 and/or a wearable haptic device 150. In some embodiments, the personal gaming device 120 may be considered a mobile device or another example of a gaming device 112. The personal gaming device 120 may be considered a mobile device or another example of a gaming device 112. In some embodiments, the personal gaming device 120 is configured to be owned and carried by a player 124. For instance, a player 124 may be allowed to play a game at their personal gaming device 120 without ever having to physically engage a gaming device 112. The personal gaming device 120 may correspond to a mobile communication device, such as a smartphone, tablet, laptop, PDA, wearable device, an augmented reality headset, a virtual reality headset, or the like. In other embodiments, the personal gaming device 120 may correspond to a PC, gaming device, or the like that facilitates improved lottery game play for the player 124. Any of the above-mentioned examples of a personal gaming device 120 may correspond to an example of a gaming device as described herein.

In some embodiments, the wearable feedback device 150 may be any haptic device that provides the player 124 with haptic feedback, such as simulating touch, and/or biometric sensor device that receives biometric measurements from the player 124. An example of a haptic device that provides haptic feedback responses comprises one or more electrical motors or actuators (e.g., ultrasound transducer) or air vortex rings that apply force or generate vibrations or forces in the player's 124 skin. An example of a biometric sensor device is any device that senses and/or measures a biometric parameter, such as heat rate, calories burned, steps walked, blood pressure, release of certain biochemicals, time spent exercising, physical strain, and forecasting changes in mood or stress. In some configurations, the personal gaming device 120 can also or alternatively provide haptic feedback responses to the player 124 and/or sense a biometric parameter of the player 124. While the wearable feedback device 150 is shown as a smartwatch, it is to be understood that the device 150 can be in any configuration, including an activity tracking device, wrist or ankle band, eyeglasses, clothing, and other wearable items appreciated by those of ordinary skill in the art.

In some embodiments, a personal gaming device 120 or wearable feedback device 150 may be configured to communicate directly with a gaming device 112. In some embodiments, some or all of the game play may be achieved with the personal gaming device 120 and/or wearable feedback device 150 rather than relying on the use of a gaming device 112. Where a personal gaming device 120 and/or wearable feedback device 150 interacts with a gaming device 112, direct machine-to-machine communications may utilize a proximity-based communication protocol such as NFC, Bluetooth®, BLE, WiFi, or the like. Alternatively or additionally, the personal gaming devices 120 and/or wearable feedback device 150 may be configured to communicate with other personal gaming devices 120 and/or the central gaming server 116 via the communication network 108. Such communications may be secured (e.g., encrypted) or unsecured depending upon the nature of information exchanged during the communications. A personal gaming device 120 and/or wearable feedback device 150 may correspond to a player's 124 personal device that uses an unsecured or untrusted communication network 108 or to a device issued to the player 124 during the player's visit at a particular casino, in which case the personal gaming device 120 and/or wearable feedback device 150 may be administered with certain casino-approved security policies.

It should be appreciated that the central gaming server 116 may or may not be co-located with the gaming devices 112a, b, . . . . Further still, players 124 may be allowed to carry multiple personal gaming devices 120, which may or may not be required to communicate or pair with a gaming device 112.

FIG. 1 also depicts the possibility of some personal gaming devices 120 and/or wearable feedback devices 150 being paired with a gaming device 112, thereby enabling communications to flow between the personal gaming device 120 and/or wearable feedback device 150 on the one hand and the gaming device 112 on the other. This communication may utilize a proximity-based communication protocol, such as Bluetooth, BLE, NFC, WiFi, etc. One or more personal gaming devices 120 of a third party 180 may not necessarily be paired with a gaming device 112, but such personal gaming devices 120 may still be configured to communicate with the central gaming server 116 via the communication network 108. Communications between the gaming device 112 and personal gaming device 120 may facilitate any number of combinations of gameplay opportunities.

The central gaming server 116 is in communication, via the gaming network 104, with one or more databases 184. The databases 184 may be configured to store one or multiple data structures that are used in connection gaming interactive activities of players 124 and the gaming system 100. The databases can use any database model and compatible database management system. Examples of database models include relational databases, object-oriented databases, and non-relational databases, such as NoSQL and NewSQL databases.

Figure 2:
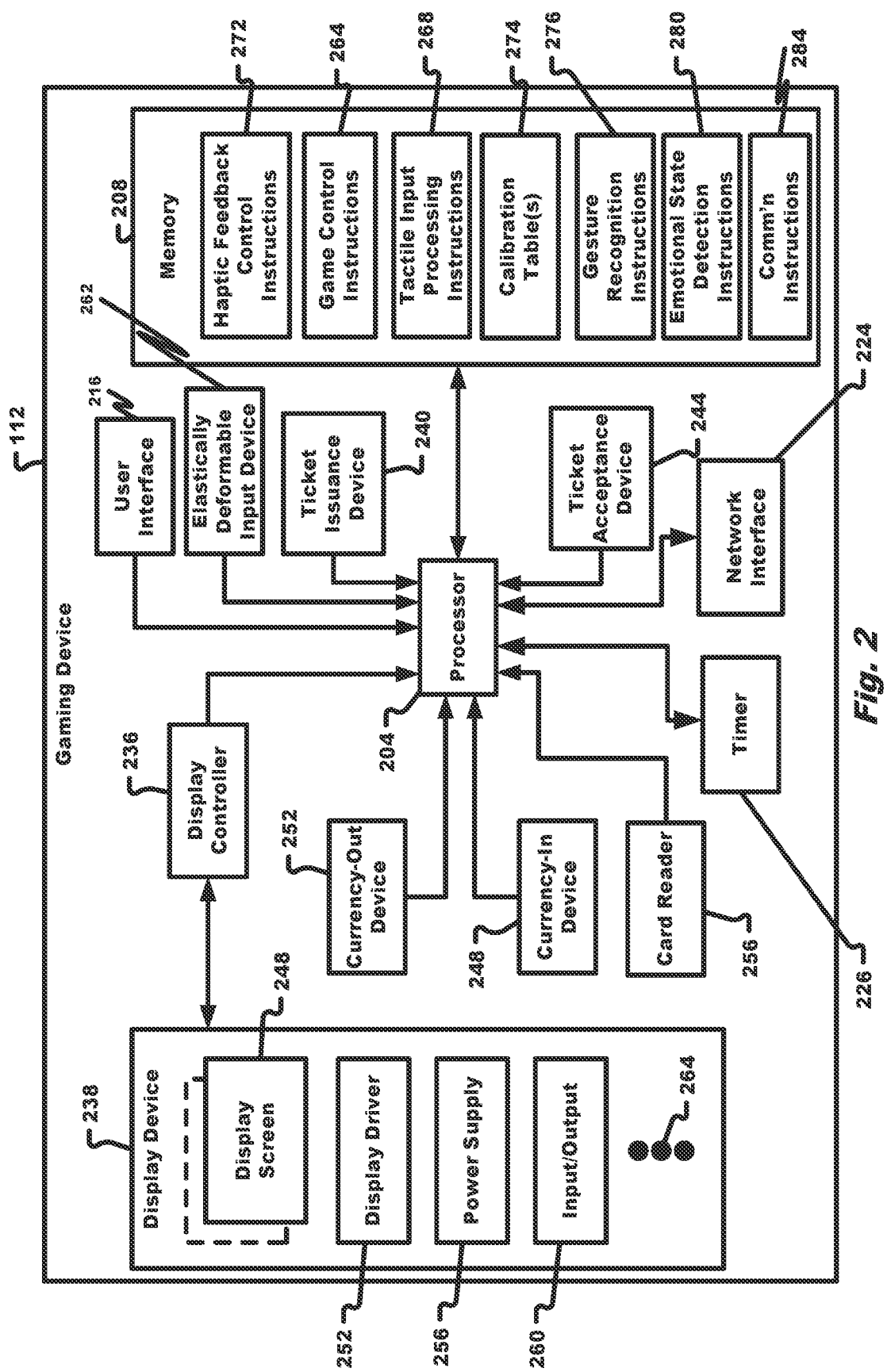
FIG. 2 depicts a gaming device in accordance with embodiments of the present disclosure.

With reference to FIG. 2, additional details of the components that may be included in a gaming device 112 or any other gaming device will be described in accordance with at least some embodiments of the present disclosure.

A gaming device 112 may correspond to a portable or non-portable device used for executing a gaming application or multiple different gaming applications without departing from the scope of the present disclosure. Non-limiting examples of a gaming device 112 include an EGM, a VGM, EGT, EGT player station, VR gaming machine, AR gaming machine, a mobile communication device (e.g., a smartphone, laptop, wearable device, etc.), a laptop, a PC, etc. The illustrative gaming device 112 depicted herein may include a support structure, housing or cabinet, which provides support for a plurality of displays, inputs, controls and other features of a conventional gaming machine. In some embodiments, a player 124 plays gaming device 112 while sitting, however, the gaming device 112 is alternatively configured so that a player can operate it while standing, moving, or sitting. The illustrated gaming device 112 can be positioned on the floor but can be positioned alternatively (i) on a base or stand, (ii) as a pub-style table-top game, (iii) as a stand-alone computational device on the floor of a casino with other stand-alone computational devices, or (iv) in any other suitable manner. The gaming device 112 can be constructed with varying cabinet and display configurations.

The gaming device 112 is shown to include a processor 204, memory 208, a network interface 224, a user interface 216, timer 226, and an elastically deformable input device 262.

In some embodiments, the processor 204 may correspond to one or many microprocessors, CPUs, microcontrollers, Integrated Circuit (IC) chips, or the like. For instance, the processor 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 204 may be provided as a microcontroller, microprocessor, Central Processing Unit (CPU), or plurality of microprocessors that are configured to execute the instructions sets stored in memory 208. In some embodiments, the instruction sets stored in memory 208, when executed by the processor 204, may enable the gaming device 112 to provide game play functionality.

The nature of the network interface 224 may depend upon whether the network interface 224 is provided in cabinet- or player station-style gaming device 112 or a mobile gaming device 112. Examples of a suitable network interface 224 include, without limitation, an Ethernet port, a USB port, an RS-232 port, an RS-485 port, a NIC, an antenna, a driver circuit, a modulator/demodulator, etc. The network interface 224 may include one or multiple different network interfaces depending upon whether the gaming device 112 is connecting to a single gaming network 104 or multiple different types of gaming networks 104. For instance, the gaming device 112 may be provided with both a wired and wireless network interface 224 without departing from the scope of the present disclosure.

The user interface 216 may include a combination of user input devices and user output devices. For instance, the user interface 216 may include a display screen, speakers, buttons, levers, a touch-sensitive display, or any other device that is capable of enabling player 124 interaction with the gaming device 112. The user interface 216 may also include one or more drivers for the various hardware components that enable player 124 interaction with the gaming device 112.

The timer 226 can be a software program and/or mechanical, electromechanical, or electronic timing device or hardware timer that generates timing signals, or timestamps, and enables the processor to track an elapsed time interval between two events. Timer 226 can be a countdown or count up timer. In one configuration, the timer is a hardware timer in the form of a digital counter that either increments or decrements at a fixed frequency. The timer can use comparison logic to compare a current timer value against a specific value, set by software, that triggers some action when the timer value matches the preset value.

Figure 3:
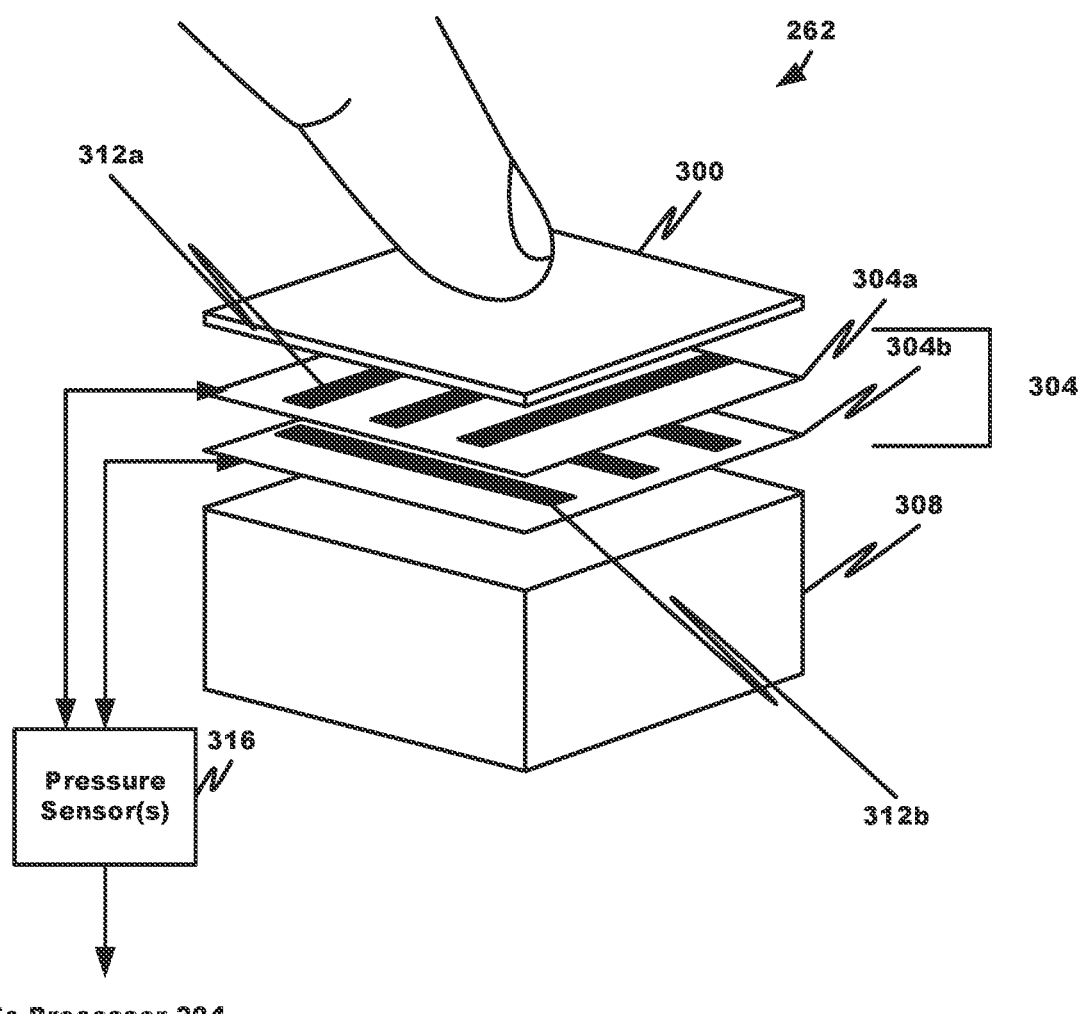
FIG. 3 depicts an exploded view of an elastically deformable input device in accordance with embodiments of the present disclosure.

The elastically deformable input device 262 detects, at each of a plurality of input electrode locations, an amount of pressure applied to the elastically deformable outer layer at a corresponding input electrode location in response to deformation of the input device by physical contact with the player of the gaming device. With reference to FIG. 3, the elastically deformable input device 262 includes an elastically deformable outer layer 300, sensing network layer 304, and inner or kinesthetic layer 308.

The outer layer 300 can be any elastically deformable material, particularly an artificial skin having the feel and/or appearance (e.g., color and texture) and/or mechanical properties of natural skin. In such applications, the thickness of the outer layer can be similar to that of the epidermis layer of skin. Typically, the outer layer has a thickness typically of no more than about 2 mm, more typically of no more than about 1.5 mm, and more typically of no more than about 1.25 mm. To resemble skin, the outer layer can be composed of a flexible and deformable material, such as a gelatinous substance (e.g., gelatine, polyvinyl alcohol gel, and agar), a liquid suspension (e.g., suspensions of lipid, polymeric, and inorganic particles), an elastomeric material (e.g., silicone and polyurethane), and/or an epoxy resin, with a silicone (such as "Dragon-Skin-Silicone™") or polyurethane being typical. The outer layer can include nano- and micro-fillers to produce desired mechanical, thermal, optical, dielectric, and magnetic properties. To provide desired color properties, the outer layer can include pigments and/or dyes.

The elastic and deformable sensing network layer 304 is positioned beneath and adjacent to the outer layer 300. The sensing network layer 304 is configured as an elastic and deformable conductive electrode network in a transverse interconnecting configuration of electrodes. The electrodes 312a and 312b can be, for example, a conductive metal, a conductive ink, a conductive silicon, a conductive fabric, and/or a conductive thread formed on a single substrate or, as shown, on overlapping substrates 304a and 304b. The conductive electrode network formed by the intersections of the electrodes 312a and 312b can be configured in a matrix or discrete layout and sense pressure by a difference between a player 124 applied resistance and a baseline resistance and/or between a player 124 applied capacitance and a baseline capacitance. In one configuration, each of the input electrode locations is formed at an intersection of transversely oriented electrodes 312a and 312b, such as in a grid pattern, and connected electrically to one or more pressure sensors 316. Physical or tactile interaction with the outer layer, or skin surface, such as stroking, pinching, tickling, rubbing, stretching, a slapping, finger tapping, finger moving, and grabbing, can be detected and interpreted by the input from the affected input electrode locations to the pressure sensor(s). 316

The elastically deformable kinesthetic or inner layer 308 is formed beneath and adjacent to the sensing network layer 304 and imparts desired mechanical properties to the input device 262. The mechanical properties can resemble those of human skin. In some applications, each layer of the input device and the input device itself have a Young's modulus typically ranging from about 0.045 to about 0.35 MPa and more typically ranging from about 0.05 to about 0.25 MPa when measured by a suction test; a Young's modulus typically ranging from about 0.30 to about 1.25 MPa and more typically ranging from about 0.35 to about 1 MPa when measured by a torsion test; an elastic strain typically of at least about 7.5% and more typically of at least about 10% relative to a dimension in an absence of elastic deformation; and/or an elastic stretch width and an elastic stretch length typically of at least about 7.5% and more typically at least about 10%.

Figure 4:
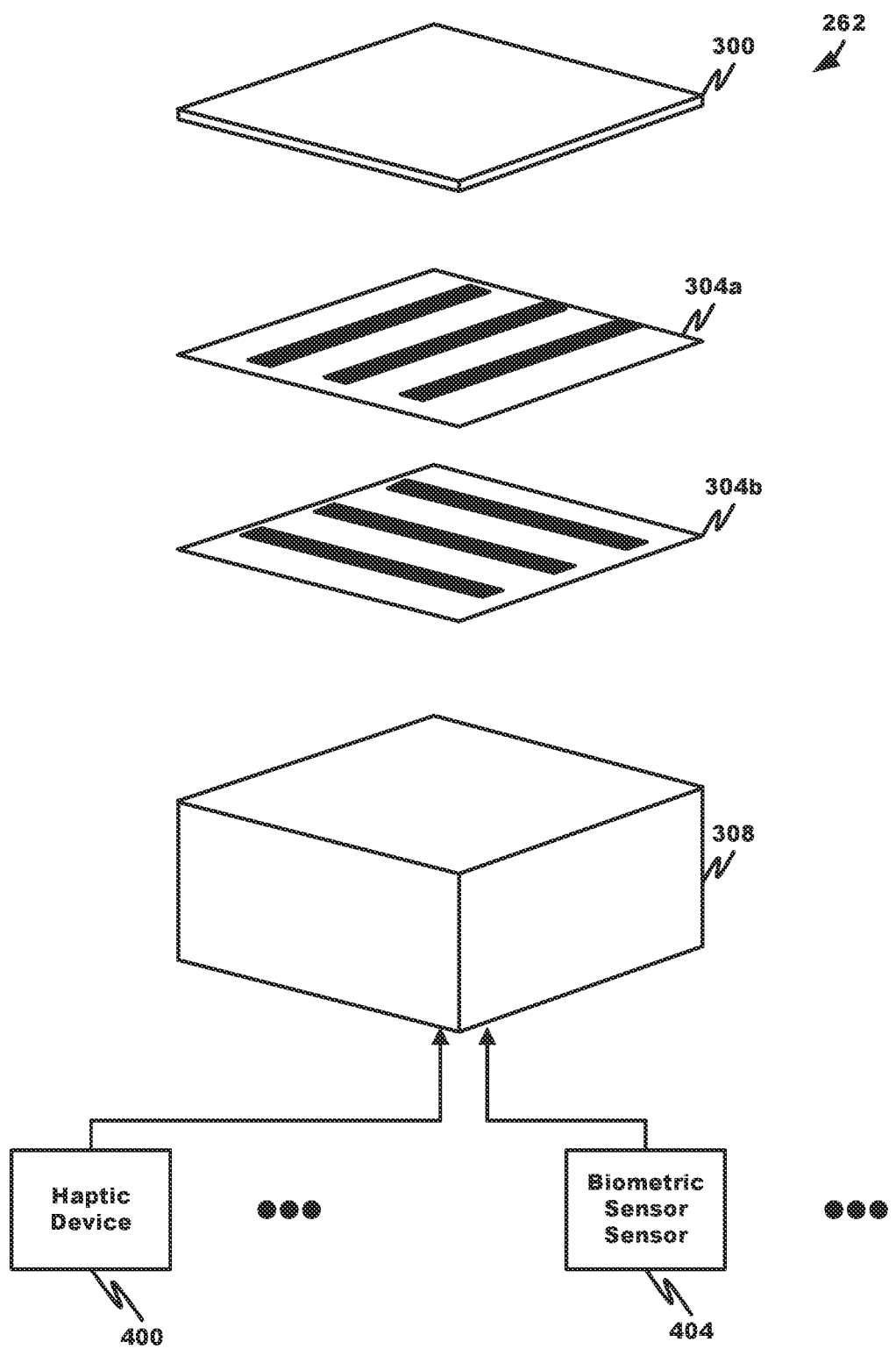
FIG. 4 depicts another exploded view of an elastically deformable input device in accordance with embodiments of the present disclosure.

With reference to FIG. 4, the elastically deformable input device 262 can include in the sensing network and/or inner layer (as shown) any haptic device 400 that provides the player 124 with haptic feedback, such as simulating touch, and/or biometric sensor device 404 that receives biometric measurements from the player 124. An example of a haptic device 400 that provides haptic feedback responses comprises one or more electrical motors or actuators (e.g., ultrasound transducer) or air vortex rings that apply force or generate vibrations or forces in the player's 124 skin. The haptic motor or actuator can be embedded within the inner layer 308 of the input device 262 such that, when the player interacts with the outer layer 300, the haptic motor or actuator is activated. The haptic motor or actuator can also be controlled by the gaming device 112 to allow for stronger haptic feedback in direct relationship to a level or magnitude of applied player pressure. Another example of a haptic device uses surface haptics applied using an electrostatic material or ultrasonic actuators positioned under the outer layer 300. The XY or spatial position of the point of player contact with the input device 262 and/or amount of player applied pressure can be used to control the force and the identities (e.g., locations) of actuators used to create the haptic feedback. Another example of a haptic device 400 is a heating or cooling element, such as a Peltier thermoelectric heater, embedded within the input device 262 to allow heat and/or cooling to be applied to the outer layer 300 such that if a user squeezes the outer layer 300, the temperature can responsively heat up or cool down. Alternatively, the heating or cooling element can adjust the temperature of a desired part of the outer layer 300 to indicate that the player is to touch and/or squeeze the heated or cooled area. Alternatively, the heating or cooling element can provide alternating real-time hot and/or cold sensations to provide the player with a haptic feedback response to the player regarding the level of performance of the player's interaction. Another example of a haptic device 400 comprises a ferrofluid and a magnetic field emitter positioned in input device 262, such as in a pouch or compartment in one or more of the layers 300, 304 and 308, that changes a softness or hardness of the input device and/or outer layer in response to a magnetic field applied by the magnetic field emitter. The ferrofluid hardens or softens in the presence of the applied magnetic field.

The haptic device can change the outer layer's 300 surface characteristics (e.g., texture, color, etc.) to express feelings or emotions. For example, the outer layer 300 can express "goosebumps"; it can stretch or clinch itself (tensed vs. relaxed); it can represent illness (skin deflections); it can shake to represent shivering (e.g. with actuators or vibration engines); and the like. Such changes of the outer layer 300 can express feelings of an avatar or emotion rendered by the gaming device 112 or another player on a different gaming device 112. The resultant responsive contact of the player with the outer layer 300 can be interpreted and/or analyzed to indicate the player's emotions and map them onto the outer layer's surface to reflect the player's feelings. Other examples include: haptic feedback responses indicating that an avatar or emoji rendered by a display of the gaming device 112 is anxious or excited in response to a trigger event, the outer layer 300 displaying goose bumps; the outer layer 300 blushing when ashamed of a small win; the outer layer 300 turning pale when it gets scared; the outer layer 300 turning red (e.g., irritated and/or deflected) when the player pushes the button to hard; and the outer layer 300 changing in shape and/or color to simulate muscles or tendons, tenseness, or increased blood pressure associated with an avatar or emoji rendered by the display of the gaming device.

An example of a biometric sensor device 404 is any device that senses and/or measures a biometric parameter, such as heat rate, calories burned, steps walked, blood pressure, release of certain biochemicals, time spent exercising, physical strain, and forecasting changes in mood or stress. By way of illustration, the biometric sensor device 404 can include in or adjacent to the outer or inner layers a temperature sensor or thermocouple to sense, as player input, one or more of player squeeze movements, player body temperature, and player touch spatial location.

Returning again to FIG. 2, the memory 208 may include one or multiple computer memory devices that are volatile or non-volatile. The memory 208 may include volatile and/or non-volatile memory devices. Non-limiting examples of memory 208 include Random Access Memory (RAM), Read Only Memory (ROM), flash memory, Electronically-Erasable Programmable ROM (EEPROM), Dynamic RAM (DRAM), etc.

The memory 208 may be configured to store the instruction sets depicted in addition to temporarily storing data for the processor 204 to execute various types of routines or functions. The instruction sets can enable user interaction with the gaming device 112 and game play at the gaming device 112. Examples of instruction sets that may be stored in the memory 208 include a haptic feedback control instruction set 272, game control instruction set 264, tactile input processing instruction set 268, calibration table(s) 274, gesture recognition instruction set 276, emotional state detection instruction set 280, and communication instruction set 284. In addition to the instruction sets, the memory 208 may also be configured to store a random number generator (not shown) that is used by the game control instruction set 264, for example, to provide game outputs.

In some embodiments, the game control instruction set 264, when executed by the processor 204, may enable the gaming device 112 to facilitate one or more games with the player(s) 124. In some embodiments, the game control instruction set 264 may include subroutines that receive electronic messages from player(s) and others comprising an indication of consideration (e.g., a wager, mini wager, side wager, etc.) for occurrence of a predicted level of player performance in the game, subroutines that stream a video of the game to gaming and personal gaming devices 112, 120 of other non-players or third parties 180, subroutines that create, maintain and update player profiles of the player(s) to the game, subroutines that generate, such as by a random number generator, an outcome of the game, subroutines that alter, modify, or select game or display operations or functions in response to input from the elastically deformable input device 262, subroutines that calculate whether an outcome of the game has resulted in a win or loss during the game, subroutines for determining payouts for the player(s) and others in the event of a win, subroutines for exchanging communications with another device, such as another gaming device 112 or gaming server 116, and any other subroutine useful in connection with facilitating game play at the gaming device 112.

The tactile input processing instruction set 268, when executed by the processor 204, may enable the gaming device 112 to process input from the pressure sensor(s) 316. The input can be, for example, a magnitude of sensed pressure at each input electrode location and an identification of the corresponding input electrode location. calibration table(s) 274 store one or more measurement calibration factors, that may be indexed by one or more of type and location of haptic feedback response relative to the respective location of the input electrode, pressure sensor type coupled to the input electrode, ambient temperature and pressure, electrode type corresponding to the input electrode, and/or other factors that affect the sensed magnitude, that are used by the processor 204 to correct the magnitude of the sensed pressure and provide an adjusted second amount of pressure. The calibration factors can, for example, null out the effects of interference caused by the input device generating a haptic feedback response, such as applying a force to the player, changing a temperature of the outer layer, generating vibrations in the outer layer, and the like. Stated differently, the processor, using the calibration tables, can, for each input electrode location, apply a calibration factor to the raw or unadjusted sensed amount of pressure to remove, from the sensed amount of pressure, a contribution from the haptic player feedback response and provide an adjusted amount of pressure attributable to deformation of the input device by the player.

The gesture recognition instruction set 276, when executed by the processor 204, in response to detection, at each input electrode location of the plurality of elastically deformable input electrode locations, an amount of pressure applied to the elastically deformable outer layer 300 at the corresponding input electrode location in response to deformation of the elastically deformable outer layer 300 by physical contact with a player of a gaming device, determines, based on timing signals or timestamps received at frequent intervals during application of the pressure by the player 124, that the player has applied pressure to the plurality of elastically deformable input electrode locations continuously over at least a predetermined time interval, determines a pressure pattern corresponding to the plurality of elastically deformable input electrode locations, and compares the pressure pattern to a plurality of different pressure patterns corresponding to a plurality of different player gestures to determine a player gesture corresponding to the pressure pattern. Based on the determined gesture and a comparison of the amount of applied pressure to a threshold magnitude, the processor 204, executing the game control instruction set 264, determines an operation of the gaming device 112.

In multi-touch gestures by the player, the processor 204, when executing the gesture recognition instruction set 276, receives first and second sets of pressure values corresponding respectively to first and second amounts of pressure applied to different first and second portions of the plurality of elastically deformable input electrode locations, receives first and second timing signals associated respectively with the first and second sets of pressure values, the first and second timing signals each indicating a time interval over which the player continuously applied the first and second amounts of pressure, respectively, determines, from the first and second sets of pressure values, first and second pressure patterns, and determines, based on the first and second timing signals, that the first and second pressure patterns are part of a common multi-touch player gesture by the player. The processor 204 then compares the first and second pressure patterns against the plurality of different pressure patterns corresponding to a plurality of different player gestures to determine a multi-touch player gesture corresponding to the first and second pressure patterns.

Figure 9A:
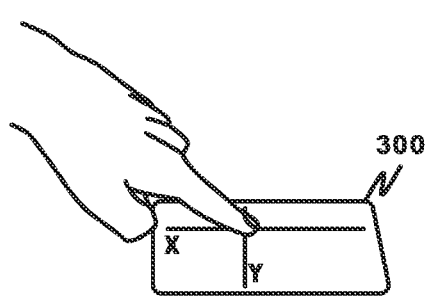
FIG. 9A illustrates a gesture received by an elastically deformable input device in accordance with embodiments of the present disclosure.
Figure 9B:
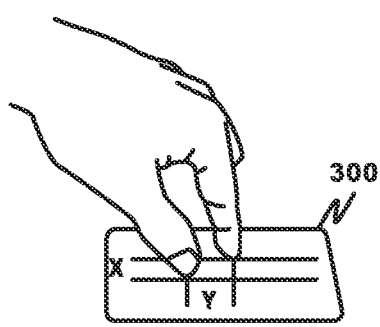
FIG. 9B illustrates a gesture received by an elastically deformable input device in accordance with embodiments of the present disclosure.
Figure 9C:
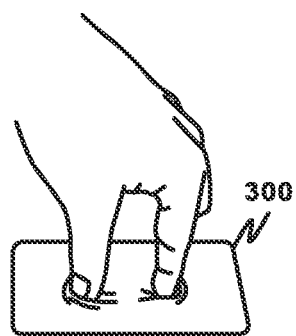
FIG. 9C illustrates a gesture received by an elastically deformable input device in accordance with embodiments of the present disclosure.
Figure 9D:
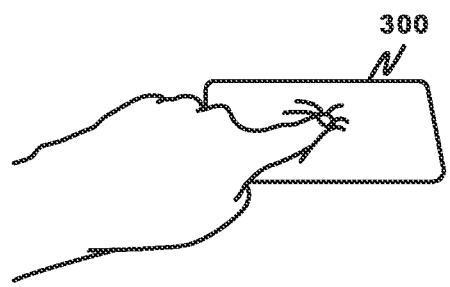
FIG. 9D illustrates a gesture received by an elastically deformable input device in accordance with embodiments of the present disclosure.
Figure 9E:
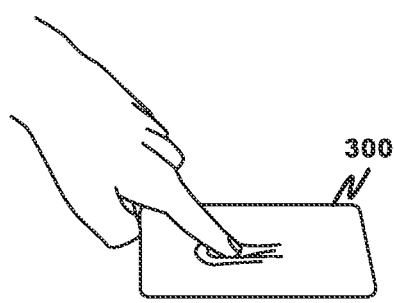
FIG. 9E illustrates a gesture received by an elastically deformable input device in accordance with embodiments of the present disclosure.
Figure 9F:
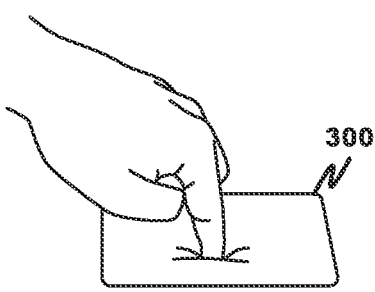
FIG. 9F illustrates a gesture received by an elastically deformable input device in accordance with embodiments of the present disclosure.
Figure 9G:
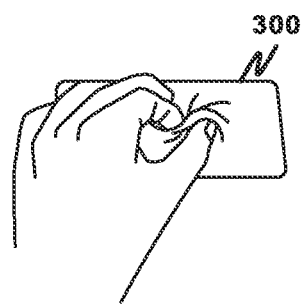
FIG. 9G illustrates a gesture received by an elastically deformable input device in accordance with embodiments of the present disclosure.
Figure 9H:
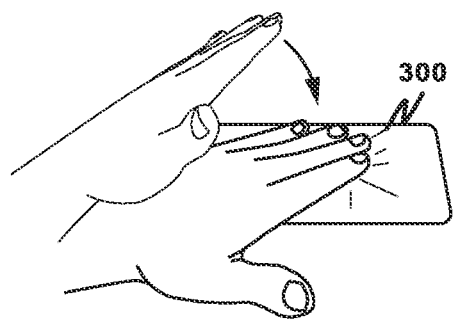
FIG. 9H illustrates a gesture received by an elastically deformable input device in accordance with embodiments of the present disclosure.
Figure 9I:
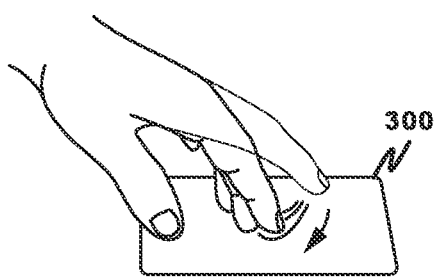
FIG. 9I illustrates a gesture received by an elastically deformable input device in accordance with embodiments of the present disclosure.
Figure 9J:
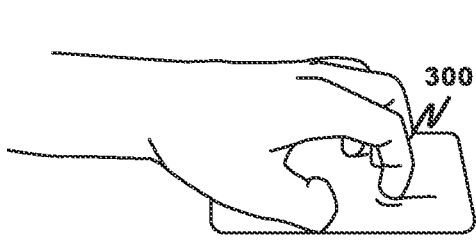
FIG. 9J illustrates a gesture received by an elastically deformable input device in accordance with embodiments of the present disclosure.
Figure 9K:
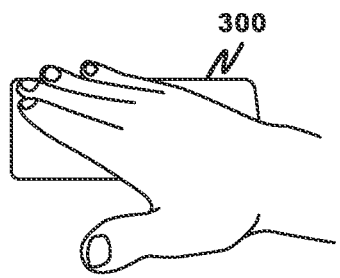
FIG. 9K illustrates a gesture received by an elastically deformable input device in accordance with embodiments of the present disclosure.
Figure 9L:
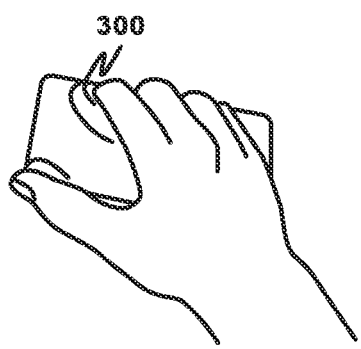
FIG. 9L illustrates a gesture received by an elastically deformable input device in accordance with embodiments of the present disclosure.
Figure 9M:
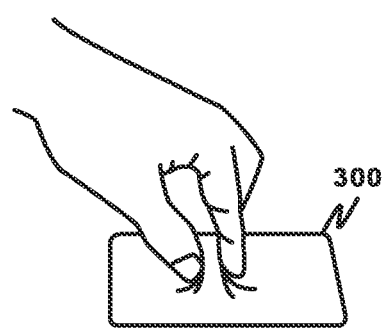
FIG. 9M illustrates a gesture received by an elastically deformable input device in accordance with embodiments of the present disclosure.
Figure 9N:
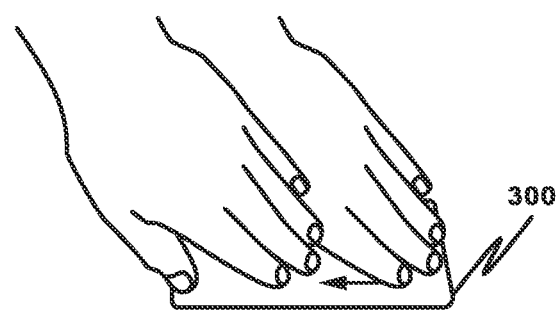
FIG. 9N illustrates a gesture received by an elastically deformable input device in accordance with embodiments of the present disclosure.

The various player gestures that may be identified based on player touch input are depicted in FIGS. 9A through 9N. With respect to FIG. 9A, a single-touch gesture, namely a light finger press, is depicted. The pressure pattern for the single-touch gesture is clustered around the X-Y position surrounding a set of points having the highest sensed pressure from the finger touch, which typically corresponds to the approximate center of the finger contact area. No other areas of applied pressure by the player are detected outside of this pressure pattern. With reference to FIG. 9B, a multi-touch gesture, namely a dual finger press, is depicted. The multi-touch gesture corresponds to multiple pressure patterns, each for a single-touch gesture clustered around the X-Y position surrounding a set of points having the highest sensed pressure from the respective finger touch. Other than the first and second finger touches, no other areas of applied pressure by the player are detected outside of this pressure pattern.

The remaining figures depict other gestures, namely FIG. 9C depicts a stretch gesture in which the finger contact surface areas move outwardly from each other as a function of time, FIG. 9D depicts a finger press and rotation in which the finger contact surface area remains substantially stationary during a first time interval but has a varying pressure pattern as a function of time in the first time interval, with the set of points having a highest sensed pressure moving, during a second time interval, in a clockwise or counter-clockwise pattern (depending on finger movement) as a function of time, FIG. 9E depicts a finger slide gesture in which the finger contact surface area moves substantially linearly as a function of time, FIG. 9F depicts a hard finger slide gesture in which the finger contact surface area remains substantially stationary as a function of time in a manner similar to a light finger pressure gesture but unlike the light finger press gesture has a maximum applied pressure more than a selected threshold, FIG. 9G depicts a pull or pinch gesture followed by a twist, in which, over a first time interval, the first and second pressure patterns corresponding to first and second fingers of the player move away from each other for a pull and towards each other for a pinch and, during a second time interval, the first and second pressure patterns, alternatively or additionally, moving, during a second time interval, in a clockwise or counterclockwise pattern (depending on finger movement) as a function of time, FIG. 9H depicts a slap gesture in which the pressure pattern size corresponds to multiple finger touches and remains substantially stationary but has a rapidly increasing magnitude of sensed pressure for all contact points as a function of time, FIG. 9I depicts a finger tap gesture in which the pressure pattern for one or more finger point contacts can remain substantially stationary as a function of time but one or more other pressure patterns for one or more finger points of contact have a short duration during a selected time interval with the frequency of contact indicating an emotional state of the player, FIG. 9J depicts a multi-finger drag gesture in which the pressure patterns for multiple finger point contacts move substantially uniformly in a common direction as a function of time, FIG. 9K depicts a sustained contact gesture in which one or more pressure patterns corresponding to one or more contact points remain substantially uniform in both sensed pressure magnitude and X-Y distribution and location as a function of time, FIG. 9L depicts a grab gesture in which first and second pressure patterns, one corresponding to a single finger and the second to multiple fingers (such that the contact surface areas associated with each vary substantially in magnitude) move towards each other as a function of time, FIG. 9M depicts a finger pull or pinch gesture in which the first and second pressure patterns corresponding to first and second fingers of the player move away from each other for a pull and towards each other for a pinch as a function of time, and FIG. 9N depicts a stroke gesture in which multiple finger or a large multi-finger contact surface area move(s) substantially linearly and at a substantially constant displacement rate as a function of time. The player can create customized gestures and/or sequences of customized gestures and optionally applied pressure levels to cause the game control instruction set to perform certain functions or operations, such as unlocking a user account of the player and/or to login to the gaming device 112. As will be appreciated, innumerable other gestures are possible in accordance with the principles of this disclosure.

The gesture recognition instruction set 276 can use any number of algorithms to map the sensed pressure magnitude and its distribution and displacement as a function of time. Exemplary algorithms include dynamic time warping (DTW), naïve bayes (NB), decision tree (DT), support vector machine (SVM), and bidirectional long short-term memory network (BLSTM). In one application, sensed resistance or capacitance signals from the pressure sensor(s) and input electrode locations are converted into touch X-Y coordinates, the sensed signals are calibrated using the calibration table(s) to remove background noise, the pressure pattern blobs or images are upscaled and converted into a binary image and identified using contour detection, the relative surface area of each pressure pattern is calculated, and the surface area and location and strength, or pressure distribution and magnitude, as a function of time used to select the corresponding gesture from among multiple possible gestures.

The emotional state detection instruction set 280, when executed by the processor 204, can receive the amount of pressure applied by the player at a selected input electrode location of the plurality of input electrode locations and compare the amount of applied pressure to a baseline magnitude and a duration of player application of the pressure on the input device 262 to determine an emotional state of the player of the gaming device. The emotional state detection instruction set 280 can further use a type of detected player gesture (e.g., how hard the player squeezes in a grab gesture) as an additional data input point in determining player emotional state. For example, an angry player might do a hand slap gesture (FIG. 9H), hand drag gesture (FIG. 9J), or grab gesture (FIG. 9L) having a maximum pressure magnitude in excess of a selected threshold. An excited, nervous, or confused player might do a single or multi-finger tap gesture (FIG. 9I). The game control instruction set 264 can cause the processor 204, based on the emotional state of the player, to alter, modify, select, or instantiate a game operation or function, such as alerting casino staff when the player pushes the gaming device 112 or is otherwise angry and rate the game or game elements as a type of satisfaction survey using emotional haptics. The game control instruction set 264 can further cause the processor to generate the haptic and/or audible player feedback response.

The haptic feedback control instruction set 272, when executed by the processor 204, can, based upon the emotional state of the player 124 or identified player gesture, select from among multiple possible haptic feedback responses an appropriate type, location, duration, and amplitude of haptic feedback response and cause generation of the haptic feedback response via the wearable haptic device 150 and/or the elastically deformable input device 262. The plurality of haptic feedback responses can comprise at least one of changing a temperature of the elastically deformable outer layer 300, changing a hardness and/or softness of the elastically deformable outer layer 300, changing a texture of the elastically deformable outer layer 300, changing a color of the elastically deformable outer layer 300, vibrating the elastically deformable outer layer 300, increasing an electrostatic force resisting physical contact of the elastically deformable outer layer 300 by the player 124, and emission of an electric shock and/or a series of vibrations by the wearable haptic device and/or the elastically deformable input device to simulate a touch sensation on the player's skin.

In some applications, the processor 204 receives, from a different gaming device 112, an emotional state or other input of another player 124 and, based on the emotional state or input of the other player, selects a haptic response from a plurality of potential haptic responses; and causes generation of the selected haptic response to the player.

This capability enables players to share haptic emotions via the gaming network as part of a game. For example, multiple EGMs can be connected to a central virtual avatar at the gaming server 116, and the player treating the avatar right (e.g. by demonstrating a correct sequence of haptic emotions) wins a mystery win from the avatar. In another example, all players among the connected gaming devices 112*a*, *b*, . . . apply certain haptic gestures with the fastest and/or best and/or most accurate series of gestures winning (e.g. across multiple gaming devices or in a bank competition).

In some applications, the processor 204, in response to the detected emotional state or other input of another player 124 received by the input device 262, determines that the player is a problem gambler and alerts casino personnel to assist the player 124. As will be appreciated, a problem gambler is a player that has an urge to gambler continuously despite negative consequences or a desire to stop. Problem gambling is often defined by whether harm is experienced by the gambler or others, rather than by the gambler's behavior.

The communication instruction set 284, when executed by the processor 204, may enable the gaming device 112 to communicate with the central gaming server 116 and/or personal gaming device 120 or multiple personal gaming devices 120 and/or wearable haptic device 150. In some embodiments, the communication instruction set 284 may include instructions that enable the gaming device 112 to pair with a personal gaming device 120 and/or wearable haptic device 150 and establish a communication channel with the personal gaming device 120 and/or wearable haptic device 150 via the pairing. As an example, the communication instruction set 284 may include instructions that enable NFC, Bluetooth®, Wi-Fi, or other types of communication protocols. It should be appreciated that the communication instruction set 284 may also be updated to reflect when a personal gaming device 120 and/or wearable haptic device 150 is paired with the gaming device 112 and such pairing information may include addressing information for the personal gaming device 120 and/or wearable haptic device 150 and/or identification information associated with the player 124 of the personal gaming device 120 and/or wearable haptic device 150. Alternatively or additionally, the communication instruction set 284 may enable the gaming device 112 to identify a player 124 of the personal gaming device 120 and/or wearable haptic device 150, identify a loyalty account associated with the player 124 of the personal gaming device 120 and/or wearable haptic device 150, exchange information (e.g., send or receive) with a loyalty application operating on the personal gaming device 120 and/or wearable haptic device 150, or combinations thereof. In some embodiments, the communication instruction set 284 may be configured to operate or drive the network interface 224 to facilitate direct or indirect communications with a personal gaming device 120 and/or wearable haptic device 150.

While shown as separate instruction sets, it should be appreciated that any of the haptic feedback control instructions 272, game control instructions 264, tactile input processing instructions 268, gesture recognition instructions 276, emotional state detection instructions 280, and communication instructions 284 may correspond to a subroutine of the game control instruction set 264 without departing from the scope of the present disclosure.

The gaming device 112 is further shown to include a ticket issuance device 240, a ticket acceptance device 244, a currency in device 248, a currency out device 252, and a card reader 256. The ticket issuance device 240 may be configured to print physical tickets, vouchers, or the like. The ticket acceptance device 244 may be configured to receive, scan, and/or recognize information from an input physical ticket, voucher, or cash. In some embodiments, the ticket issuance device 240 and ticket acceptance device 244 may operate in concert with a common piece of hardware that both accepts and produces physical tickets, vouchers, or the like. Tickets or vouchers printed by ticket issuance device 240 and recognizable by the ticket acceptance device 244 may correspond to physical lottery tickets, casino vouchers, paper coupons, and the like. Alternatively or additionally, the ticket issuance device 240 and/or ticket acceptance device 244 may be connected to ticket or cash reading hardware. In such an embodiment, the ticket issuance device 240 and ticket acceptance device 244 may operate as a driver and/or firmware component for the card reader.

Similarly, the currency in device 248 and currency out device 252 may include or operate in concert with a coin slot or any other type of coin delivery mechanism. The currency in device 248 and currency out device 252 may include hardware, drivers, or firmware that facilitate receiving or distributing tokens, coins, chips, etc. In some embodiments, the currency in device 248 may be configured to determine an amount of coins (an amount of tokens, an amount of chips, etc.), input at the coin slot and convert the values into credits for playing games with the game instruction set 264. The currency out device 252 may correspond to hardware and software configured to output coins, tokens, chips, etc. if a player decides to cash out or convert playing credits back into coins, tokens, or chips, etc.

The card reader 256 may include hardware and/or software configured to read or accept any type of card, or portable credential (e.g., NFC, Bluetooth, Wi-Fi, etc.). In some embodiments, the card reader 256 may include hardware and/or software that enable contactless reading of a card, token, or portable credential. In some embodiments, the card reader 256 may include hardware and/or software that enable contact-based reading of a card, token, or portable credential (e.g., magstripe, chip reader, electrodes, card-receiving slot, etc.). It should be appreciated that the card reader 256 may be configured to receive and reader a card or portable credential, token, in any type of format (e.g., portable plastic card, magstripe card, key fob, etc.). It should also be appreciated that the card reader 256 may be configured to write information or data onto a card or portable credential. Furthermore, in some embodiments, the card reader 256 may be configured to read a player loyalty card in the form of a plastic credit-card shaped credential. In some embodiments, the card reader 256 may enable communications with a loyalty application operating on a player's personal gaming device 120.

The gaming device 112 may include one or more display devices 238 configured to render information, live video, communications windows, wagering interface windows, games, interactive elements, and/or other visual output to one or more display screens 248. The gaming device 112 may include one or more display controllers 236 configured to control an operation of the display device 238. This operation may include the control of input (e.g., player input via the user interface 216, command input via the instruction sets in memory 208, combinations thereof, etc.), output (e.g., display, rendered images, visual game behavior, etc.) and/or other functions of the display device 238.

In an embodiment, the display device 238 comprises one or more display screens 248 that are configured to selectively activate pixels and/or display elements to render one or more games, windows, indicators, interactive elements, icons, characters, lights, images, etc. Non-limiting examples of the display screen 248 may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens 248 may be separated into a main display and a secondary display.

In an embodiment, the display device 238 comprises one or more projectors to project virtual reality or augmented reality images during the game. The projector(s) can be any projecting device that can project a computer image onto a projection augmented model (PA model) and/or a spatially augmented reality (SAR) model to provide the players 124 with augmented reality, augmented virtuality, and/or virtual reality computer-generated game environments. As will be appreciated, projection mapping, video mapping or SAR typically uses one or more optical devices or projectors that project a beam of light onto a selected space to provide the player with the augmented reality, augmented virtuality, and/or virtual reality computer-generated game environments.

In an embodiment, the display device 238 comprises head-mounted displays worn by the players 124 to view the augmented reality, augmented virtuality, or virtual reality computer-generated game environments.

The display device 238 may include a display driver 252, a power supply 256, an input/output 260, and/or other components 264 configured to enable operation of the display device 238. The display driver 252 may receive commands and/or other data provided by the processor 204 and one or more of the instruction sets in memory 208. In response to receiving the commands, the display driver 252 may be configured to generate the driving signals necessary to render the appropriate images to the display screen 248. The power supply 256 may provide electric power to the components of the display device 238. In some embodiments, the power supply 256 may include a transformer and/or other electronics that prevent overloading, condition power signals, and/or provide backup power to the display device 238. The input/output 260 may correspond to one or more connections for receiving or exchanging information and/or video from components of the gaming device 112. The input/output 260 may include an interconnection to the network interface 216. By way of non-limiting example, the input/output 260 may include a high-definition multimedia interface (HDMI) input, Ethernet, composite video, component video, H.264, or other video connection.

Figure 5:
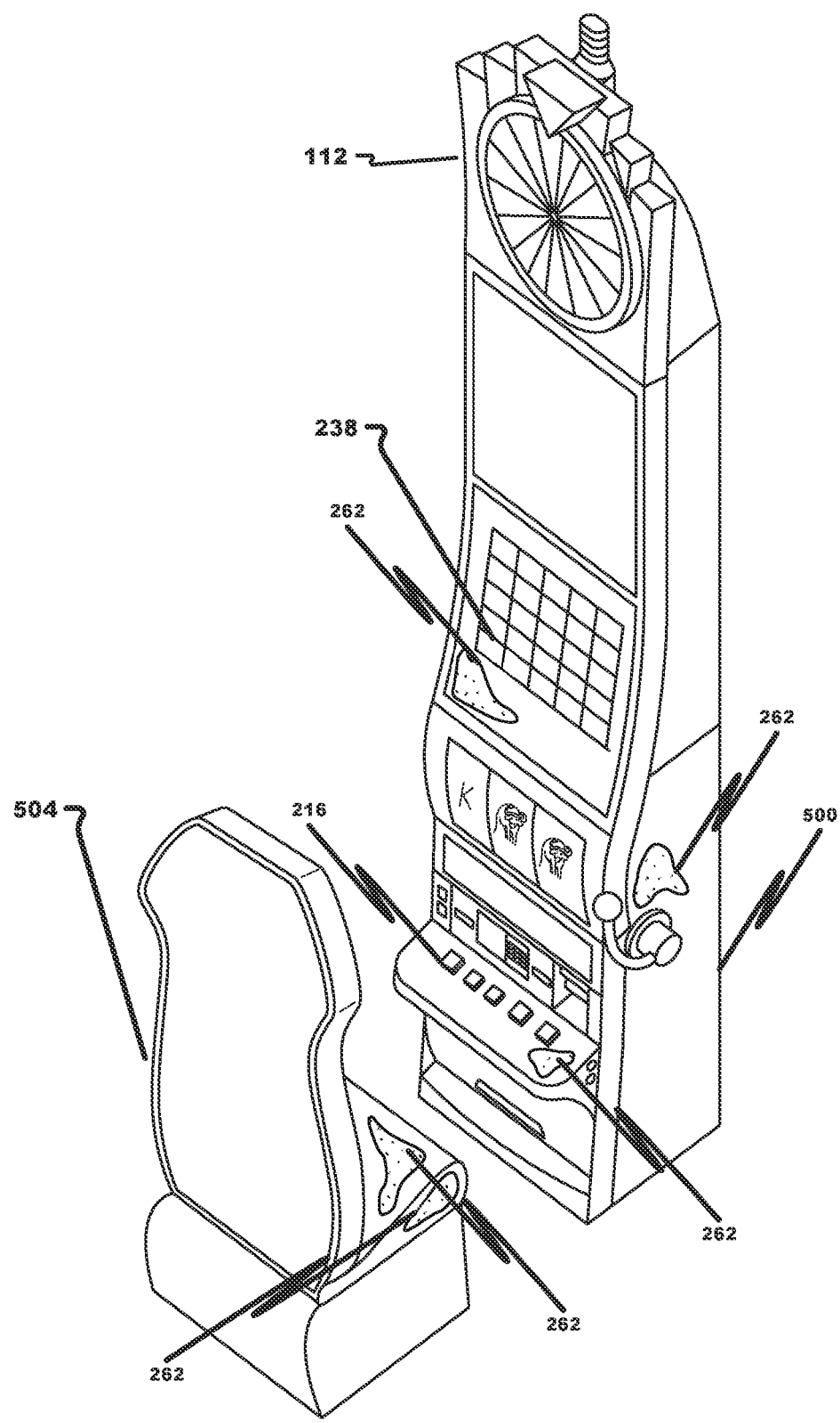
FIG. 5 illustrates gaming device comprising elastically deformable input devices in accordance with embodiments of the present disclosure.

With reference now to FIGS. 5-8 a variety of gaming device 112 locations for the elastically deformable input device 262 will be described in accordance with embodiments of the present disclosure. As shown in FIG. 5, the gaming device 112, such as an EGM, can comprise the elastically deformable input devices 262 formed at various locations on the exterior of the gaming device 112. For example, the elastically deformable input device 262 can be located near the display 238, on the exterior of the cabinet housing 500 of the gaming device 112, on the user interface 216 of the gaming device 112, and on the seat 504 (e.g., head rest, arm rest, back rest, cup holder, leg rest, and seat cushion) to accommodate the player while playing a game on the gaming device 112.

Figure 6:
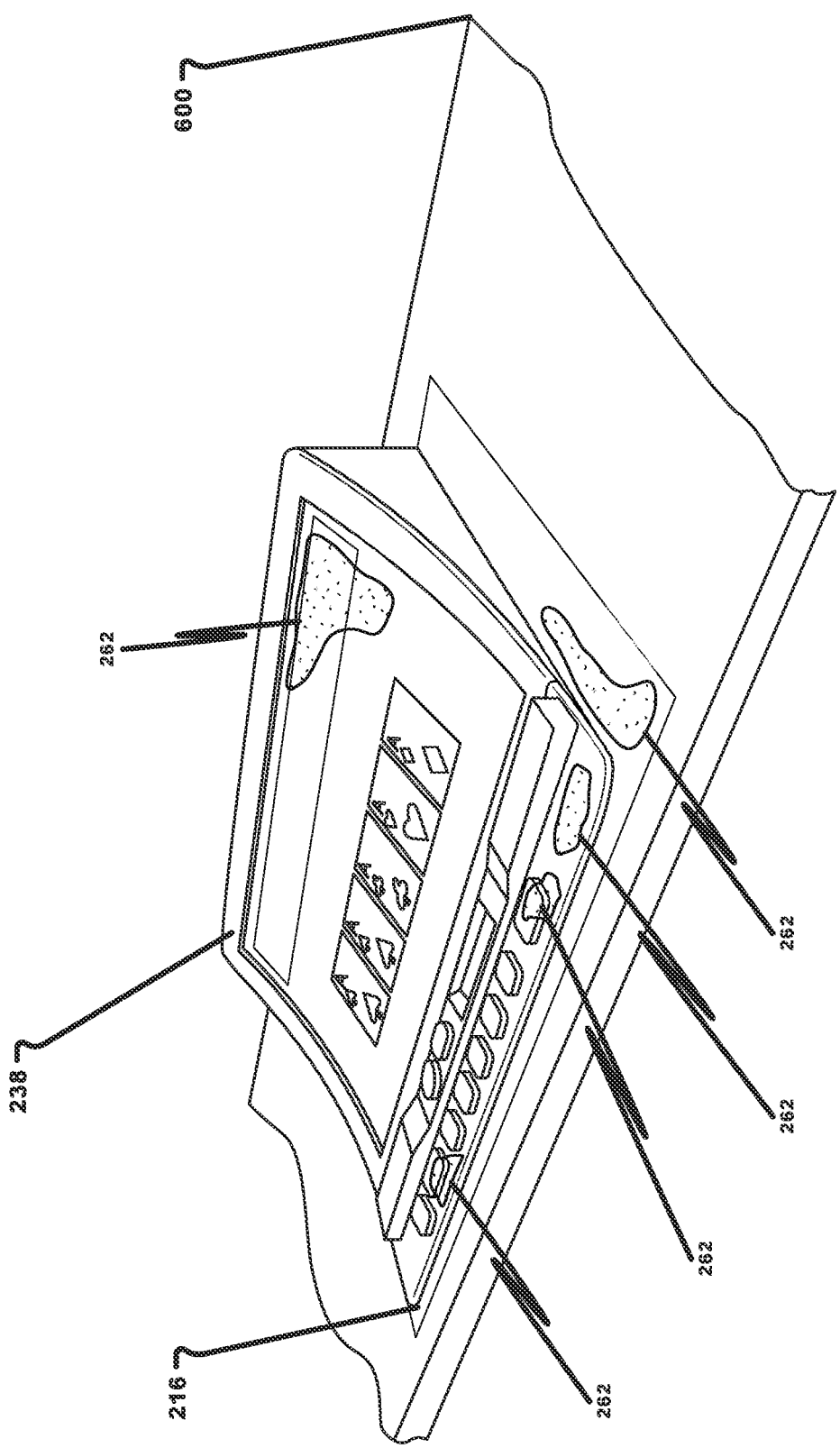
FIG. 6 illustrates gaming device comprising elastically deformable input devices in accordance with embodiments of the present disclosure.

Referring to FIG. 6, the gaming device 112, such as an EGT, can comprise the elastically deformable input devices 262. By way of illustration, the elastically deformable input device 262 can be located on the display 238, buttons and other controls on the user interface 216 and on the game play surface 600 in proximity to a seating position of the player 124. In one application, the input device 262 is located at an arm or hand rest near a mechanical button panel of the gaming device. Using the elastically deformable input device 262 as a touch sensor in the around the mechanical buttons of the gaming device 112 can provide better wrist support in addition to provide the player with an additional input option. The input device 262 can further be applied to the mechanical button itself to provide a touch-sensitive mechanical button. The modified button can provide a mechanical play or other action button that provides the button with dual capabilities, namely the button can be pressed normally but also the input device 262 on the button surface can allow the gaming device 112 to detect where the button is touched as well as how much pressure has been applied to the button.

Figure 7A:
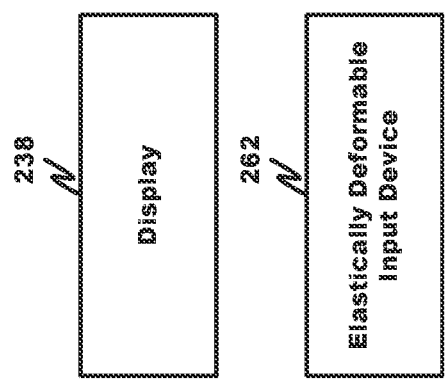
FIG. 7A illustrates a display of a gaming device comprising elastically deformable input devices in accordance with embodiments of the present disclosure.
Figure 7B:
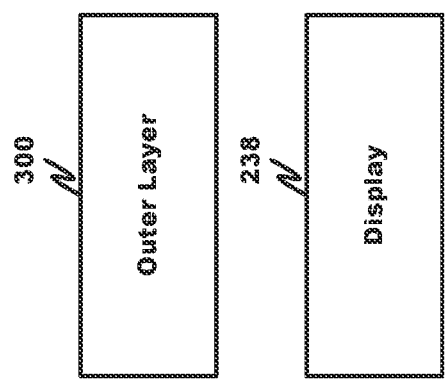
FIG. 7B illustrates a display of a gaming device comprising elastically deformable input devices in accordance with embodiments of the present disclosure.
Figure 7C:
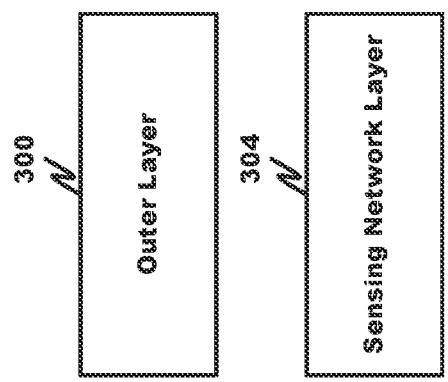
FIG. 7C illustrates a display of a gaming device comprising elastically deformable input devices in accordance with embodiments of the present disclosure.
Figure 7D:
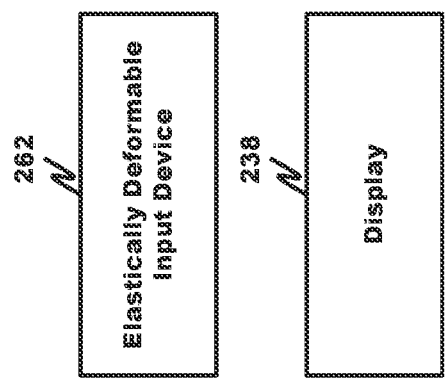
FIG. 7D illustrates a display of a gaming device comprising elastically deformable input devices in accordance with embodiments of the present disclosure.
Figure 6:
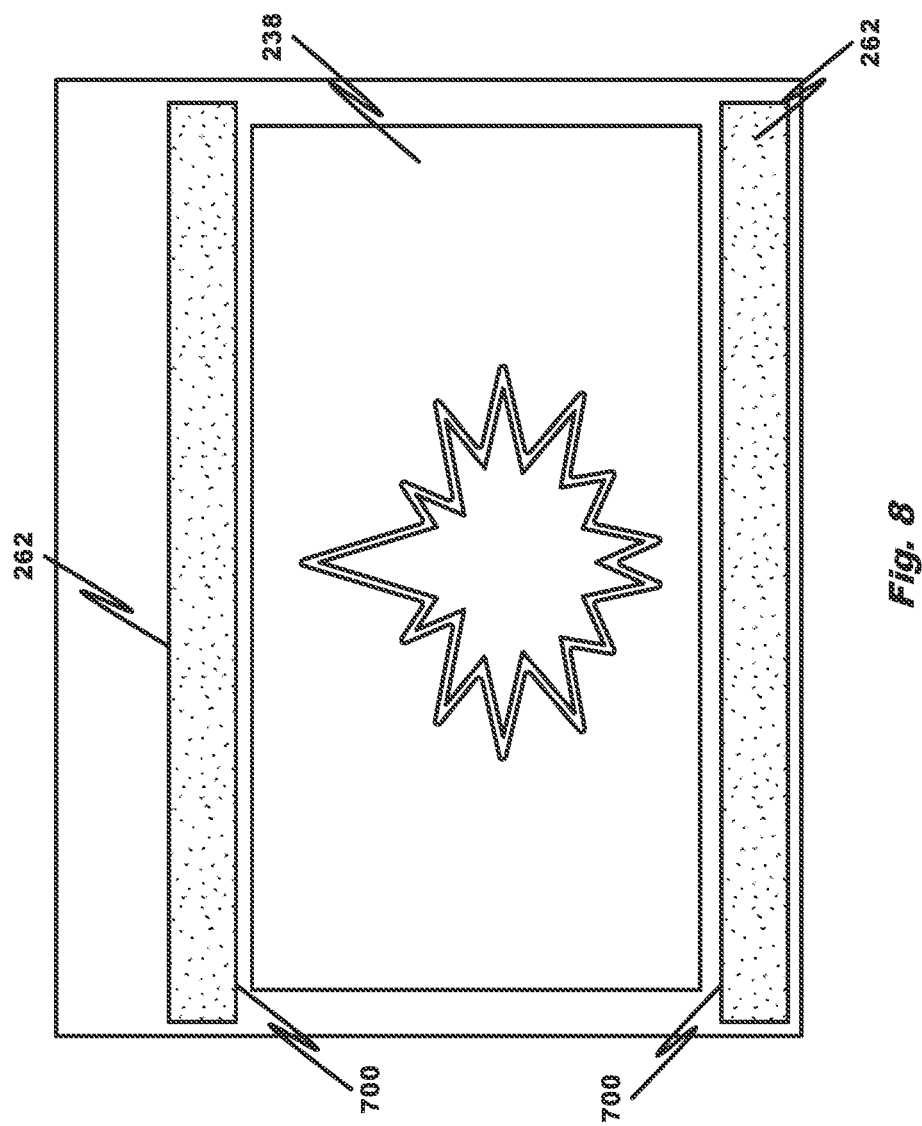

Referring to FIGS. 7A-7D, the elastically deformable input device 262 can be integrated or incorporated into the display 238 itself. As shown in FIGS. 7A and 7D, the elastically deformable input device 262 can be located behind or in front of the display 238. In the latter configuration, the elastically deformable input device 262 is substantially transparent, translucent or optically transmissive to enable the displayed content to be viewed, through the elastically deformable input device 262, by the player 124. As shown in FIG. 7B, the substantially transparent, translucent or optically transmissive outer layer 300 can be positioned in front of the display 238 and the sensing network and inner layers 304 and 308 on the reverse or opposing side of the display 238. Finally as shown in FIG. 7C, the substantially transparent, translucent or optically transmissive outer and sensing network layers 300 and 304 can be positioned in front of the display 238 and the inner layer 308 on the reverse or opposing side of the display 238. In all of these configurations, the display 238 can be a thin flexible LED or LCD display having mechanical properties similar to the elastically deformable input device 262. An exemplary touch sensitive display could be the ICE LED-Flex Film™, PixelFlex FlexThin™, or Wesiri LED Matrix™ LED panels.

Incorporating the input device 262 and the display 238 can allow the player to have different ways of interacting with the display 238 and thereby enable the display to capture different and new types of context. A solid color rendered by the display in the area of the input device touched by the player can show how much or how large of the surface area was pressed by the player. The color can be changed in direct relationship to the pressure applied by the player to the input device 262. In other examples, a bonus round could be played where the player is required to push or press hard on the touch area of the display where a moving object is located to stop and hold the object. The input device could be used to set a wager, where the harder the player presses means the player desires a proportionately higher wager or vice versa. A lighter touch could be used to decrease the wager or vice versa. The display can display indicators, such as an object and/or color to indicate where on the display area the user should interact with the input device surface. The display can indicate or render colors and/or bars and/or icons to indicate which interaction gesture the player should apply to the input device and/or its level of intensity or magnitude of the applied pressure.

FIG. 8 depicts a display surrounded by a touch sensitive bezel 700. The elastically deformable input device 262 has been positioned on top of the bezel, or area around the outside of the display 238, as a substantially transparent, translucent or optically transmissive material. In response to the player physically contacting the elastically deformable input device 262 on top of the bezel, the processor 204 can modify, alter or invoke a game function or operation, such as a bonus round. For example, bonus rounds may use the touch area to cause light to travel where the player 124 is touching the input device 262 or indicate where the player 124 must touch the input device 262.

The game function or operation modified, altered or invoked in response to player input sensed by the elastically deformable input device 262 can take many forms. For example, the input can enable the player 124 to interact with an avatar or emoji rendered on the display 238. The intensity of the touch can control the size of the avatar or emoji, an emotion demonstrated by the avatar or emoji (e.g., a high amount of pressure applied by the player 124 to the input device 262 can cause the display of an avatar or emoji to have an angry facial expression, a tickling gesture applied to the input device can cause the display of an avatar or emoji having a laughing or happy facial expression, a stroking gesture can cause the display of an avatar or emoji to have a sympathetic facial expression, and a tapping gesture applied to the input device can cause the display of an avatar or emoji to have a surprised facial expression). The avatar or emoji can likewise provide haptic feedback responses, via the input device or a wearable haptic device, to the player 124 responsive to the player gestures.

In other examples, the player 124 can use gestures to cause the avatar or emoji to perform actions that impact an outcome of the game. The player 124, for instance, can perform a pinch gesture to the avatar or emoji if it has made a wrong decision and/or recommendation to cause the avatar or emoji from making mistakes in the future and become a "better" companion. The player 124 can perform a stroke gesture to the avatar or emoji if it has made a good decision and/or recommendation to award it for being a "good" companion. Different interactions with the avatar or emoji can trigger it to make different decisions and/or perform different actions, e.g., a stroke gesture causes the avatar or emoji to be nice and calm and a pinch gesture can cause the avatar or emoji to make it angry with different bonuses and/or game events being triggered.

The surface conditions of the input device 262 (e.g., the artificial skin in the outer layer 300) can also impact the game elements. The input device 262 can be formed at specific positions or reformed so as to have an impact on game elements. Manipulation of the input device can, in a bonus round, control the movement of a virtual ball roll on a surface by manipulating the physical surface to cause desired movement of the ball into a target location. For example, the virtual surface deforms proportionately to deformation of the input device 262 by the player, with the ball rolling along the deformed virtual surface to a desired destination. The player 124, in a bonus round, can apply a pinch gesture in a desired location to open or break an object, such as a safe, with an amount of applied breakage pressure being at least a threshold amount. The player 124, in a bonus round, can perform a rub gesture to reveal a scratch ticket on the display 238. The player 124 can perform a squeeze gesture, in a bonus round, to cause balls to pop up and be broken in response to the gesture. The player 124 can, in a bonus round, view facial expressions of virtual faces and, to each face, apply by suitable gesture or haptic emotions to win the game.

In other examples, a player 124 can play a slot game (spin reels etc.) using different types of interactions and/or gestures as expressions of haptic emotions. The player can control through interacting with the input device 262 a speed of reel spins such as by using a pressure of pushing on touch surface. The player 124 can enable "Special Spins" by stroking, pinching, tickling or rubbing, etc. (e.g. have different spin types and/or outcomes and/or reel strips when activating "Special Spins"). Those special spins could be unlocked over time and with limited use. The player 124 can introduce an "Immediate Reel Stop" via a squeezing gesture applied to the input device 262.

Input devices 262 can be located at various positions in and around the gaming device 112a, b, . . . to gather information about the player's 124 position or the position of a part of the player's body (e.g., a digit, hand, forearm, elbow, etc.). For instance in the examples above, the processor 204 can use the input device 262 located on the button panel and around the housing or cabinet to detect when a player rests their arms on the cabinet, the input device located on the seat cushion to determine when a player is seated but inactive on the gaming device or has stood up, and the input device located on the cabinet and seat to detect pressure points and interpret seating position (so as to provide the player with recommendations on more comfortable seating positions). The input devices 262 on the seating cushion can be used by the processor 204 to detect the player's heart rate, pulse, blood flow, and the like.

Figure 10:
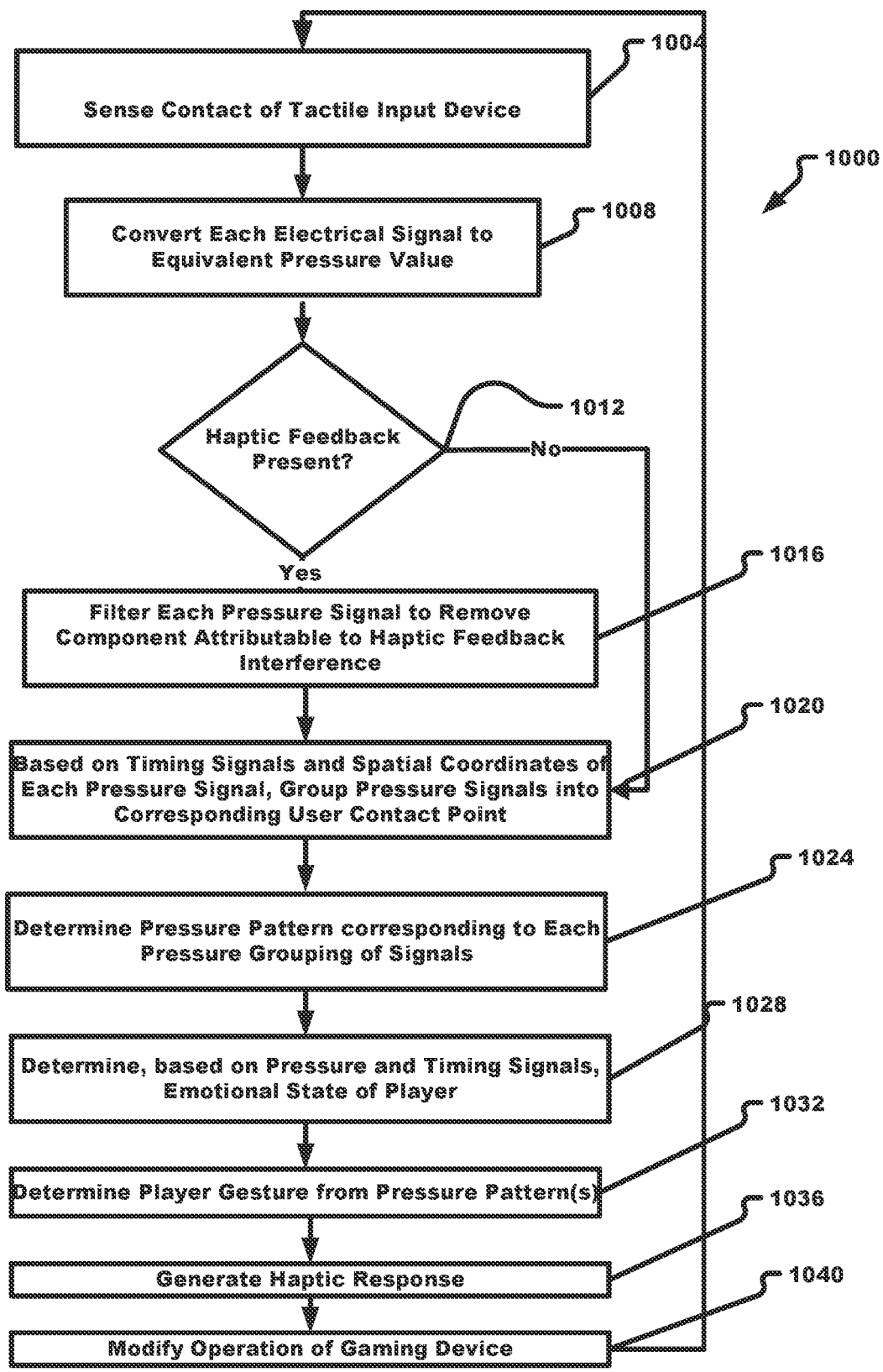
FIG. 10 is a flow chart illustrating signal processing for elastically deformable input device output in accordance with embodiments of the present disclosure.

FIG. 10 shows an embodiment of the process used by the gaming device 112 and/or game server 116 to process and respond to tactile input received by the elastically deformable input device 262.

The method 1000 starts upon sensing of a tactile contact by the elastically deformable input device 262. The tactile contact can be a touch, gesture, or other tactile input from the player 124 that is received by the outer layer 300 and sensed by the sensing network layer 304 (step 1004).

The method 1000 may continue by the gaming device 112 processor (or gaming server 116 processor) converting, using baseline calibration factors in the calibration table(s) 274, each electrical signal received from each player contacted input electrode location into an equivalent pressure value (step 1008).

The method 1000 may continue by the gaming device 112 processor (or gaming server 116 processor) determining whether each received sensed electrical signal comprises a component (or noise) attributable to haptic feedback (decision diamond 1012). This can be done by determining whether or not a haptic feedback response was being provided or generated in the area of the outer layer 300 contacted by the player 124.

When a received electrical signal comprises a component attributable to haptic feedback, the method may continue by the gaming device 112 processor (or gaming server 116 processor) filtering the received electrical signal to remove the haptic feedback component attributable to haptic feedback interference (step 1016). The can be done by applying appropriate calibration factors from the calibration table(s) 274 that are different from the baseline calibration factors. The baseline calibration factors correct for noise in the absence of haptic feedback.

When the received electrical signals do not comprise a component attributable to haptic feedback or after correction or adjustment of the electrical signals for the presence of haptic feedback, the method may continue by the gaming device 112 processor (or gaming server 116 processor), based on timing signals and spatial coordinates of the input electrode location for each pressure signal, grouping the pressure signals into a corresponding user contact point (step 1020). The timing signals indicate a time interval over which the player continuously contacted the input device 262 and therefore indicates what input electrode locations are part of a common point of contact by the player 124.

The method may continue by the gaming device 112 processor (or gaming server 116 processor) determining a pressure pattern corresponding to each pressure grouping of signals or blob (step 1024). To facilitate the spatial interpretation process and generation of pressure patterns, the image can be upscaled, and the transformed cross-point values converted into a binary image. Contour detection can then be applied to separate distinct elements on the image as blobs. Each resulting blob of input electrode locations corresponds to a pressure pattern and can be discrete from the spatial areas of other blobs and relate to a plurality of input electrode locations contacted by a common digit(s) or body member(s) of the player.

The method may continue by the gaming device 112 processor (or gaming server 116 processor) determining, based on the pressure and timing signals received from the timer that correspond to the duration of player physical contact with the input device 262, an emotional state of the player 124 (step 1028).

The method may continue by the gaming device 112 processor (or gaming server 116 processor) determining, based on the pressure and timing signals received from the timer that correspond to the duration of player physical contact with the input device 262, a gesture corresponding to the pressure pattern (step 1036). The timing signals enable the processor to determine that the blobs and corresponding patterns are part of a common gesture by the player. The gesture can be based on a comparison of a plurality of pressure pattern templates to the blobs of input electrode locations to yield a corresponding gesture.

The method may continue by the gaming device 112 processor (or gaming server 116 processor) determining, based on the emotional state of the player and/or gesture and/or a comparison of the pressure values to a threshold value, a haptic feedback response at a selected location of an input device 262 or at a selected set of input devices 262 (step 1036).

The method may continue by the gaming device 112 processor (or gaming server 116 processor) determining, based on the emotional state of the player and/or gesture and/or and a comparison of the pressure values to a threshold value, a modification or alteration of a function or operation of the gaming device 112 and/or a new function or operation of the gaming device 112 to be invoked by the gaming device (step 1040).

In various embodiments in which the gaming system includes a plurality of gaming devices 112, the gaming devices are configured to communicate with one another to provide a group gaming environment. In certain such embodiments, the gaming devices enable players of those gaming devices to work in conjunction with one another, such as by enabling the players to play together as a team or group, to win one or more awards. In other such embodiments, the gaming devices enable players of those gaming devices to compete against one another for one or more awards. In one such embodiment, the gaming devices enable the players of those gaming devices to participate in one or more gaming tournaments for one or more awards.

In various embodiments, the gaming system or gaming device includes one or more player tracking systems. Such player tracking systems enable operators of the gaming system or gaming device (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming device to begin a game, the card reader reads the player identification number off the player tracking card to identify the player. The gaming device timely tracks any suitable information or data relating to the identified player's game and updates the player profile or game event information in the databases 184. The gaming device also timely tracks when the player tracking card is removed to conclude play for that game. In another embodiment, rather than requiring insertion of a player tracking card into the card reader, the gaming device utilizes one or more portable devices, such as a mobile phone, a radio frequency identification tag, or any other suitable wireless device, to track when a game begins and ends. In another embodiment, the gaming device utilizes any suitable biometric technology or ticket technology to track when a game begins and ends.

In such embodiments, during one or more games, the gaming device tracks, as event information, any suitable information or data, such as any amounts wagered, average wager amounts, and/or the time at which these wagers are placed. In different embodiments, for one or more players, the player tracking system and player profile includes the player's account number, the player's card number, the player's first name, the player's surname, the player's preferred name, the player's player tracking ranking, any promotion status associated with the player's player tracking card, the player's address, the player's birthday, the player's anniversary, the player's recent games, or any other suitable data.

Certain of the gaming systems described herein, including gaming devices located in a casino or another gaming establishment, include certain components and/or are configured to operate in certain manners that differentiate these gaming devices and systems from general purpose computing devices (i.e., certain personal gaming devices such as desktop computers and laptop computers).

For instance, gaming devices are highly regulated to ensure fairness and, in many cases, gaming devices, such as gaming devices 112, are configured to award monetary awards up to multiple millions of dollars. To satisfy security and regulatory requirements in a gaming environment, hardware and/or software architectures are implemented in EGMs that differ significantly from those of general-purpose computing devices. For purposes of illustration, a description of gaming devices relative to general-purpose computing devices and some examples of these additional (or different) hardware and/or software architectures found in gaming devices are described herein.

At first glance, one might think that adapting general-purpose computing device technologies to the gaming industry and gaming devices would be a simple proposition because both general purpose computing devices and gaming devices employ processors that control a variety of devices. However, due to at least: (1) the regulatory requirements placed on gaming devices, (2) the harsh environment in which gaming devices operate, (3) security requirements, and (4) fault tolerance requirements, adapting general purpose computing device technologies to gaming devices can be quite difficult. Further, techniques and methods for solving a problem in the general-purpose computing device industry, such as device compatibility and connectivity issues, might not be adequate in the gaming industry. For instance, a fault or a weakness tolerated in a general-purpose computing device, such as security holes in software or frequent crashes, is not tolerated in a gaming device because in a gaming device these faults can lead to a direct loss of funds from the gaming device, such as stolen cash or loss of revenue when the gaming device is not operating properly or when the random outcome determination is manipulated.

Certain differences between general-purpose computing devices and gaming devices are described below. A first difference between gaming devices and general-purpose computing devices is that gaming devices are state-based systems. A state-based system stores and maintains its current state in a non-volatile memory such that, in the event of a power failure or other malfunction, the state-based system can return to that state when the power is restored or the malfunction is remedied. For instance, for a state-based gaming device, if the gaming device displays an award for a game of chance but the power to the gaming device fails before the gaming device provides the award to the player, the gaming device stores the pre-power failure state in a non-volatile memory, returns to that state upon restoration of power, and provides the award to the player. This requirement affects the software and hardware design on gaming devices. General-purpose computing devices are typically not state-based machines, and a majority of data can be lost when a malfunction occurs on a general-purpose computing device.

A second difference between gaming devices and general-purpose computing devices is that, for regulatory purposes, the software on the gaming device utilized to operate the gaming device has been designed to be static and monolithic to prevent cheating by the operator of the gaming device. For instance, one solution that has been employed in the gaming industry to prevent cheating and to satisfy regulatory requirements has been to manufacture a gaming device that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the gaming device in the presence of a gaming regulator. Regardless of whether the EPROM solution is used, to gain approval in most gaming jurisdictions, a gaming device must demonstrate sufficient safeguards that prevent an operator or a player of a gaming device from manipulating the gaming device's hardware and software in a manner that gives him an unfair, and in some cases illegal, advantage.

A third difference between gaming devices and general-purpose computing devices is authentication-gaming devices storing code are configured to authenticate the code to determine if the code is unaltered before executing the code. If the code has been altered, the gaming device prevents the code from being executed. The code authentication requirements in the gaming industry affect both hardware and software designs on gaming devices. Certain gaming devices use hash functions to authenticate code. For instance, one gaming device stores game program code, a hash function, and an authentication hash (which may be encrypted). Before executing the game program code, the gaming device hashes the game program code using the hash function to obtain a result hash and compares the result hash to the authentication hash. If the result hash matches the authentication hash, the gaming device determines that the game program code is valid and executes the game program code. If the result hash does not match the authentication hash, the gaming device determines that the game program code has been altered (i.e., may have been tampered with) and prevents execution of the game program code.

A fourth difference between gaming devices and general-purpose computing devices is that gaming devices have unique peripheral device requirements that differ from those of a general-purpose computing device, such as peripheral device security requirements not usually addressed by general-purpose computing devices. For instance, monetary devices, such as coin dispensers, bill validators, and ticket printers and computing devices that are used to govern the input and output of cash or other items having monetary value (such as tickets) to and from a gaming device have security requirements that are not typically addressed in general purpose computing devices. Therefore, many genera-purpose computing device techniques and methods developed to facilitate device connectivity and device compatibility do not address the emphasis placed on security in the gaming industry.

To address some of the issues described above, a number of hardware/software components and architectures are utilized in EGMs and EGTs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain gaming devices use a watchdog timer to provide a software failure detection mechanism. In a normally-operating gaming device, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain gaming devices use several power supply voltages to operate portions of the computer circuitry. These can be generated in a central power supply or locally on the computer board. If any of these voltages falls out of the tolerance limits of the circuitry they power, unpredictable operation of the gaming device may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain gaming devices have power supplies with relatively tighter voltage margins than that required by the operating circuitry. In addition, the voltage monitoring circuitry implemented in certain gaming devices typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the gaming device.

As described above, certain gaming devices are state-based machines. Different functions of the game provided by the gaming device (e.g., bet, play, result, points in the graphical presentation, etc.) may be defined as a state. When the gaming device moves a game from one state to another, the gaming device stores critical data regarding the game software in a custom non-volatile memory subsystem. This ensures that the player's wager and credits are preserved and to minimize potential disputes in the event of a malfunction on the gaming device. In general, the gaming device does not advance from a first state to a second state until critical information that enables the first state to be reconstructed has been stored. This feature enables the gaming device to recover operation to the current state of play in the event of a malfunction, loss of power, etc. that occurred just prior to the malfunction. In at least one embodiment, the gaming device is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the gaming device memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve gaming device critical data, although other types of non-volatile memory devices may be employed. These memory devices are typically not used in typical general purpose computing devices.

Thus, in at least one embodiment, the gaming device is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of gaming device critical information) within a time period of 200 milliseconds or less. In at least one embodiment, the time period of 200 milliseconds represents a maximum amount of time for which sufficient power may be available to the various gaming device components after a power outage event has occurred at the gaming device.

As described previously, the gaming device may not advance from a first state to a second state until critical information that enables the first state to be reconstructed has been atomically stored. After the state of the gaming device is restored during the play of a game of chance, game play may resume and the game may be completed in a manner that is no different than if the malfunction had not occurred. Thus, for example, when a malfunction occurs during a game of chance, the gaming device may be restored to a state in the game of chance just prior to when the malfunction occurred. The restored state may include metering information and graphical information that was displayed on the gaming device in the state prior to the malfunction. For example, when the malfunction occurs during the play of a card game after the cards have been dealt, the gaming device may be restored with the cards that were previously displayed as part of the card game. As another example, a bonus game may be triggered during the play of a game of chance in which a player is required to make a number of selections on a video display screen. When a malfunction has occurred after the player has made one or more selections, the gaming device may be restored to a state that shows the graphical presentation just prior to the malfunction including an indication of selections that have already been made by the player. In general, the gaming device may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device, such as the databases 186. The information stored in the non-volatile memory may be detailed enough to reconstruct a portion of the graphical presentation that was previously presented on the gaming device and the state of the gaming device (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming device prior to, during, and/or after the disputed game to demonstrate whether the player was correct or not in her assertion.

Another feature of gaming devices is that they often include unique interfaces, including serial interfaces, to connect to specific subsystems internal and external to the gaming device. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the gaming device, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming device to a remote device. Often SAS is used in conjunction with a player tracking system.

Certain gaming devices may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into a gaming device by monitoring security switches attached to access doors in the gaming device cabinet. Access violations result in suspension of game play and can trigger additional security operations to preserve the current state of game play. These circuits also function when power is off by use of a battery backup. In power-off operation, these circuits continue to monitor the access doors of the gaming device. When power is restored, the gaming device can determine whether any security violations occurred while power was off, e.g., via software for reading status registers. This can trigger event log entries and further data authentication operations by the gaming device software.

Trusted memory devices and/or trusted memory sources are included in a gaming device to ensure the authenticity of the software that may be stored on less secure memory subsystems, such as mass storage devices. Trusted memory devices and controlling circuitry are typically designed to not enable modification of the code and data stored in the memory device while the memory device is installed in the gaming device. The code and data stored in these devices may include authentication algorithms, random number generators, authentication keys, operating system kernels, etc. The purpose of these trusted memory devices is to provide gaming regulatory authorities a root trusted authority within the computing environment of the gaming device that can be tracked and verified as original. This may be accomplished via removal of the trusted memory device from the gaming device computer and verification of the secure memory device contents is a separate third party verification device. Once the trusted memory device is verified as authentic, and based on the approval of the verification algorithms included in the trusted device, the gaming device is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs and EGTs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, gaming devices that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should further be appreciated that the gaming device of the present disclosure may have varying or alternative housing configurations.

It should further be appreciated that the gaming device of the present disclosure may have varying or alternative display device configurations.

In various embodiments, the gaming device of the present disclosure is configured to be positioned on a base or stand.

It should be appreciated that the enhanced physical player interaction provided by the present disclosure, in addition to being implemented in a gaming device configured to be located on a casino floor, can be implemented in one or more personal gaming devices, such as desktop computers, laptop computers, tablet computers or computing devices, personal digital assistants, mobile phones, and other mobile computing devices.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

As will be appreciated by one skilled in the art, aspects of the present disclosure may be illustrated and described herein in any of a number of patentable classes or circumstances including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system.". Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the disclosure of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing detailed description for example, various features of the disclosure are grouped together in one or more embodiments for the purpose of streamlining the disclosure. The features of the embodiments of the disclosure may be combined in alternate embodiments other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this detailed description, with each claim standing on its own as a separate preferred embodiment of the disclosure.

Moreover, though the description of the disclosure has included description of one or more embodiments and certain variations and modifications, other variations, combinations, and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A gaming device, comprising:
   a display to render objects in a game;
   an input device comprising:
      an elastically deformable outer layer to contact a player of the gaming device; and
      an elastically deformable pressure sensing layer, operatively coupled to the elastically deformable outer layer, the elastically deformable pressure sensing layer comprising a plurality of input electrode locations electrically coupled with a pressure sensor to detect, for each input electrode location and by the pressure sensor, an amount of pressure applied to the elastically deformable outer layer at a corresponding input electrode location in response to deformation of the input device by physical contact with the player of the gaming device;
   a processor operatively coupled with the display and input device; and
   a computer memory coupled with the processor and comprising instructions stored thereon that, when executed by the processor, enable the processor to:
      receive first and second sets of pressure values corresponding respectively to first and second amounts of pressure being applied to different portions of the plurality of input electrode locations;
      receive first and second timing signals associated respectively with the first and second sets of pressure values, each of the first and second timing signals indicating a time interval over which the player continuously applied the first and second amounts of pressure, respectively;
      determine first and second pressure patterns, each of which corresponds to a portion of the plurality of input electrode locations;
      determine, based on the first and second timing signals, that the first and second pressure patterns are part of a common gesture by the player;
      compare the first and second pressure patterns to a plurality of different pressure patterns corresponding to a plurality of different player gestures to determine a player gesture corresponding to the first and second pressure patterns;
      determine, based on the comparison of the first and second sets of pressure values to a baseline value and the first and second timing signals, an emotional state of the player; and
      modify, based on the determined player gesture and the determined emotional state of the player, an operation of the gaming device, wherein different determined emotional states for a common determined player gesture yield different modifications to the operation of the gaming device.

2. The gaming device of claim 1, wherein the determined player gesture is a multi-touch gesture, wherein the first and second pressure patterns correspond to different portions of the plurality of input electrode locations, wherein the elastically deformable outer layer has a thickness of no more than about 1.5 mm, wherein the elastically deformable outer layer has a texture and color resembling skin, wherein the plurality of input electrode locations comprise a matrix layout, wherein each of the input electrode locations is formed at an intersection of transversely oriented electrodes, wherein the elastically deformable pressure sensing layer, in response to deformation of the input device and deflection of the plurality of input electrode locations by the player, outputs an applied resistance value different from a baseline resistance value output by the elastically deformable pressure sensing layer in an absence of deformation by the player, wherein the elastically deformable outer and pressure sensing layers each have a Young's modulus ranging from about 0.05 to about 0.25 MPa when measured by a suction test, and wherein the operation comprises a behavior of a virtual avatar participating in the game rendered by the display of the gaming device.

3. The gaming device of claim 1, wherein the plurality of input electrode locations comprise a discrete layout, wherein the elastically deformable pressure sensing layer, in response to deformation of the input device and deflection of the plurality of input electrode locations by the player, outputs an applied capacitance value different from a baseline capacitance value output by the elastically deformable pressure sensing layer in an absence of deformation by the player, wherein the plurality of input electrode locations comprise a conductive metal, a conductive ink, a conductive silicon, a conductive fabric, and/or a conductive thread, wherein the elastically deformable outer layer comprises an elastomeric material and/or an epoxy resin, wherein the elastically deformable outer and pressure sensing layers each have a Young's modulus ranging from about 0.35 to about 1 MPa when measured by a torsion test, wherein the operation comprises modification of a user interface element rendered by the display, and wherein the instructions, when executed by the processor, enable the processor to adjust a speed of game play and other operations in the in the game based on a rate of player inputs.

4. The gaming device of claim 1, wherein the elastically deformable outer layer comprises a silicone or polyurethane, wherein the determined player gesture comprises one of a stroke, a pinch, a tickle, a rub, a stretch, a slap, a finger tap, a finger move, a sustained contact, and a grab, wherein the instructions, when executed by the processor, further enable the processor to:
   based on the emotional state of the player, cause generation of a haptic feedback response to the player, the generated haptic feedback response comprising one or more of changing a temperature of the elastically deformable outer layer, changing a hardness and/or softness of the elastically deformable outer layer, changing a texture of the elastically deformable outer layer, changing a color of the elastically deformable outer layer, vibrating the elastically deformable outer layer, and increasing an electrostatic force resisting contact of the elastically deformable outer layer by the player.

5. The gaming device of claim 4, wherein the input device further comprises a haptic feedback layer, operatively coupled with the elastically deformable outer and pressure sensing layers, the haptic feedback layer generating the haptic feedback response, wherein the haptic feedback response comprises at least one of changing a temperature of the elastically deformable outer layer, changing a hardness and/or softness of the elastically deformable outer layer, vibrating the elastically deformable outer layer, and increasing an electrostatic force resisting physical contact of the elastically deformable outer layer by the player and wherein the processor further:

applies a calibration table to the first and second amounts of pressure to remove, from the first and second amounts of pressure, a contribution from the haptic player feedback response and provide adjusted first and second amounts of pressure for use in determining the first and second pressure patterns.

6. The gaming device of claim 4, wherein a haptic feedback device is worn by the player, is in wireless communication with the processor, and generates, in response to a command by the processor, the haptic feedback response, wherein the haptic feedback response comprises an electric shock to simulate a touch sensation on the player's skin and/or a series of vibrations to simulate a touch sensation on the player's skin.

7. The gaming device of claim 1, wherein the instructions, when executed by the processor, further enable the processor to:
receive, from a different gaming device, an emotional state of another player;
based on a determined emotional state of the other player, select a haptic feedback response from a plurality of potential haptic feedback responses; and
cause generation of the selected haptic feedback response to the player.

8. A method, comprising:
detecting, at each input electrode location of a plurality of elastically deformable input electrode locations, an amount of pressure applied to an elastically deformable outer layer at a corresponding input electrode location in response to deformation of the elastically deformable outer layer by physical contact with a player of a gaming device;
determining, by a processor, that the player has applied pressure to the plurality of elastically deformable input electrode locations continuously over at least a predetermined time interval;
determining, by the processor, a pressure pattern corresponding to the plurality of elastically deformable input electrode locations;
comparing, by the processor, the pressure pattern to a plurality of different pressure patterns corresponding to a plurality of different player gestures to determine a player gesture corresponding to the pressure pattern;
measuring, by a biometric sensor, a biometric parameter of the player;
determining, based on the measured biometric parameter, an emotional state of the player; and
determining, by the processor based on the determined player gesture and the determined emotional state of the player, an operation of the gaming device, wherein different determined emotional states for a common determined player gesture yield different operations of the gaming device.

9. The method of claim 8, wherein: the detecting comprises receiving, by the processor, first and second sets of pressure values corresponding respectively to first and second amounts of pressure applied to different and spatially distinct first and second portions of the plurality of elastically deformable input electrode locations; the determining that the player has applied the pressure to the plurality of elastically deformable input electrode locations continuously comprises receiving, by the processor, first and second timing signals associated respectively with the first and second sets of pressure values, the first and second timing signals each indicating a time interval over which the player continuously applied the first and second amounts of pressure, respectively; the determining of the pressure pattern comprises determining, by the processor, first and second pressure patterns, and determining, by the processor based on the first and second timing signals, that the first and second pressure patterns are part of a common multi-touch player gesture by the player; and the comparing comprises comparing, by the processor, the first and second pressure patterns to the plurality of different pressure patterns corresponding to a plurality of different player gestures to determine a player gesture corresponding to the first and second pressure patterns.

10. The method of claim 8, wherein the elastically deformable outer layer has a thickness of no more than about 1.5 mm, wherein the elastically deformable outer layer has a texture and color resembling skin, wherein the elastically deformable outer and pressure sensing layers each have a Young's modulus ranging from about 0.05 to about 0.25 MPa when measured by a suction test, wherein the determined player gesture comprises one of a single touch, stroke, a pinch, a tickle, a rub, a stretch, a slap, a finger tap, a finger move, a sustained contact, and a grab, wherein the plurality of elastically deformable input electrode locations are positioned at a plurality of a seat rest, an arm rest, a mechanical button, a display, and a lighting bezel and further comprising:
determining, by the processor based on the plurality of elastically deformable input electrode locations, a spatial location of a body part of the player.

11. The method of claim 8, wherein the biometric sensor comprises one or more of a thermometer or thermocouple, light source, and pulse sensor, wherein each of the elastically deformable outer layer and plurality of elastically deformable input electrode locations comprise an elastic strain of at least about 10% relative to a dimension in an absence of elastic deformation and
wherein the determining of the player emotional state comprises:
determining, based on the amount of applied pressure and the measured biometric parameter, the emotional state of the player.

12. The method of claim 8, wherein the elastically deformable outer layer and plurality of elastically deformable input electrode locations are adjacent to a flexible display of a gaming device and wherein each of the elastically deformable outer layer and plurality of elastically deformable input electrode locations comprise an elastic stretch width and an elastic stretch length of at least about 10%.

13. The method of claim 8, wherein the determining of the operation of the gaming device comprises generating, by the processor and using a haptic feedback device, a haptic feedback response to the player, wherein the haptic feedback device is adjacent to the elastically deformable outer layer and plurality of elastically deformable input electrode locations, wherein the haptic feedback response comprises at least one of changing a temperature of the elastically deformable outer layer, changing a hardness and/or softness of the elastically deformable outer layer, vibrating the elastically deformable outer layer, and increasing an electrostatic force resisting contact of the elastically deformable outer layer by the player, and wherein the detecting comprises:
applying a calibration table to the amount of pressure applied to the elastically deformable outer layer at each corresponding input electrode location to remove, from the amount of pressure, a contribution from the haptic player feedback response and provide an adjusted amount of pressure attributable to deformation of the elastically deformable outer layer by the player.

14. The method of claim 8, wherein a haptic feedback device is worn by the player and is in wireless communication with the processor, wherein the determining of the operation of the gaming device comprises causing, by the processor, the haptic feedback device to generate a haptic feedback response to the player, and wherein the haptic feedback response comprises an electric shock to simulate a touch sensation on the player's skin and/or a series of vibrations to simulate a touch sensation on the player's skin.

15. A gaming device, comprising:
an input device comprising:
an elastically deformable outer layer to contact a player of the gaming device;
an elastically deformable pressure sensing layer, operatively coupled to the elastically deformable outer layer, the elastically deformable pressure sensing layer comprising a plurality of input electrode locations electrically coupled with a pressure sensor to sense, for each input electrode location and by the pressure sensor, an amount of pressure applied to the elastically deformable outer layer at a corresponding input electrode location in response to deformation of the input device by the player of the gaming device; and
a haptic feedback device, operatively coupled to the elastically deformable outer layer, to generate a haptic player feedback response in the elastically deformable outer layer, wherein the haptic player feedback response comprises at least one of changing a temperature of the elastically deformable outer layer, changing a hardness and/or softness of the elastically deformable outer layer, vibrating the elastically deformable outer layer, and increasing an electrostatic force resisting contact of the elastically deformable outer layer by the player;
a processor operatively coupled with the input device; and
a computer memory device coupled with the processor and comprising instructions stored thereon that, when executed by the processor, enable the processor to:
receive the amount of pressure applied by the player at a selected input electrode location of the plurality of input electrode locations;
compare the amount of applied pressure to a baseline magnitude, to determine an emotional state of the player of the gaming device; and
based on the emotional state of the player, generate the haptic player feedback response.

16. The gaming device of claim 15, wherein the instructions cause the processor to determine, in response to deformation of the input device by the player of the gaming device, first and second sets of pressure values corresponding respectively to first and second amounts of pressure being applied to different portions of the plurality of input electrode locations, determine, from the first and second amounts of pressure, a multi-touch gesture of the player, and based on the determined multi-touch gesture and player emotional state, an operation of the gaming device, wherein different determined emotional states for a common determined multi-touch gesture yield different operations of the gaming device.

17. The gaming device of claim 16, wherein the instructions, when executed by the processor, further enable the processor to:
receive, from a different gaming device, an emotional state of another player; and
based on the emotional state of the other player, generate, by the haptic feedback device, a further haptic player feedback response to the player.

18. The gaming device of claim 15, wherein, during generation of the haptic player feedback response, the selected input electrode location senses a second amount of pressure applied to the elastically deformable outer layer at the selected input electrode location in response to deformation of the input device by physical contact with the player of the gaming device and wherein the instructions, when executed by the processor, further enable the processor to:
determine that the haptic feedback device is generating a haptic player feedback response when the selected input electrode location senses a second amount of pressure; and
in response, apply a calibration table to the sensed second amount of pressure to remove, from the sensed second amount of pressure, a contribution from the haptic player feedback response and provide an adjusted second amount of pressure attributable to deformation of the input device by the player.

19. The gaming device of claim 15, wherein the haptic feedback device comprises one or more of a heating element, cooling element, heat exchange fluid network, a ferrofluid and an applied magnetic field, an electrical motor, actuator, air vortex ring, and electrostatic material, wherein the instructions, when executed by the processor, further enable the processor to:
determine that the applied pressure was applied by the player to the plurality of input electrode locations continuously over at least a predetermined time interval;
determine a pressure pattern corresponding to the plurality of input electrode locations; and
compare the pressure pattern to a plurality of different pressure patterns corresponding to a plurality of different player gestures to determine a player gesture corresponding to the pressure pattern; and
wherein the haptic player feedback response is selected based at least in part from the determined player gesture.

20. The gaming device of claim 19, wherein the determined player gesture comprises one of a single touch, stroke, a pinch, a tickle, a rub, a stretch, a slap, a finger tap, a finger move, a sustained contact, and a grab wherein the elastically deformable outer layer has a thickness of no more than about 1.5 mm, wherein the elastically deformable outer layer has a texture and color resembling skin, wherein the plurality of input electrode locations comprise a matrix layout, wherein each of the input electrode locations is formed at an intersection of transversely oriented electrodes, wherein the elastically deformable pressure sensing layer, in response to deformation of the input device by the player, outputs an applied capacitance value different from a baseline capacitance value output by the elastically deformable pressure sensing layer in an absence of deformation by the player, and wherein the instructions, when executed by the processor, further enable the processor to:
determine, based on the determined player gesture and a comparison of the amount of applied pressure to a threshold magnitude, an operation of the gaming device.

* * * * *